United States Patent [19]
Drake

[11] Patent Number: 4,928,099

[45] Date of Patent: May 22, 1990

[54] TELEMETRY SYSTEM FOR AUTOMATED REMOTE CALLING AND CENTRAL DISPATCH OF SERVICES, PARTICULARLY TAXICABS

[76] Inventor: Donald L. Drake, 1500 Prater Way, Sparks, Nev. 89431

[21] Appl. No.: 162,697

[22] Filed: Mar. 1, 1988

[51] Int. Cl.[5] ........................ G08B 1/08; H04M 11/04

[52] U.S. Cl. ............................ 340/825.280; 340/307; 340/825.29; 340/539; 379/49; 379/59

[58] Field of Search ...................... 340/825.28, 825.29, 340/825.36, 505, 524, 539, 506, 825.45, 825.5, 825.71, 825.35, 287, 307, 905; 379/45, 49, 59, 63, 93, 50, 51; 455/31, 32, 33, 38; 200/308, 310, 317; 341/24, 25; 307/542.1, 443

[56] References Cited

U.S. PATENT DOCUMENTS

| | | | |
|---|---|---|---|
| 4,176,254 | 11/1979 | Tuttle et al. | 379/49 |
| 4,406,995 | 9/1983 | May | 340/539 |
| 4,614,945 | 9/1986 | Brunius et al. | 340/505 |
| 4,724,538 | 2/1988 | Farrell | 379/45 |
| 4,737,783 | 4/1988 | Tanaka et al. | 340/825.5 |
| 4,788,711 | 11/1988 | Nasco, Jr. | 379/59 |

*Primary Examiner*—Donald J. Yusko
*Assistant Examiner*—E. O. Pudpud
*Attorney, Agent, or Firm*—Spensley Horn Jubas & Lubitz

[57] ABSTRACT

Each of a large number of geographically distributed call boxes asynchronously transmits unique code-identified digital messages for taxicab request, vanadalism alarm, low power, or on-line status by Frequency Shift Keyed Bi-phase Modulated radio. To ensure receipt of any simultaneous, conflicting, messages at a central receiver, each call box repeats transmission of its messages three times at intervals. For human-initiated taxicab requests the call box itself feeds back a "cab dispatched" visual indication to satisfy the requestor after a predetermined delay. However, this indication actually represents only a highly probable occurrence and is not generated in response to an actual dispatch at a central location. The centrally received messages are processed by digital computer to eliminate redundance, display requests to a dispatcher of service, an log all requests and responses thereto.

17 Claims, 17 Drawing Sheets

TO FIG. 10b

TELEMETRY SYSTEM FOR AUTOMATED REMOTE CALLING AND CENTRAL DISPATCH OF SERVICES, PARTICULARLY TAXICABS

BACKGROUND OF THE INVENTION

1. Field of the Invention

The present invention concerns telemetry systems permitting remote registration of requests for services at a central dispatch point of such services, particularly permitting registration by radio of digitalized service requests at a computerized central dispatch point for taxicab services.

2. Background of the Invention

It is known in the prior art to transmit encoded signals from a multiplicity of remote, transmitting, locations to a central, receiving, location. Such prior art systems are often for transmitting alarms, and for summoning emergency services. Such prior art systems may transfer messages unidirectionally or bidirectionally, including by radio. However, they generally differ from the system of the present invention, amongst other aspects, by failing to transmit message information in digitalized form, by failing to accord for conflicts between multiple messages simultaneously transmitted upon a single communications channel, and by interpreting and processing all messages manually as opposed to interpreting and processing messages by automated, computerized, means.

As an example of the prior art, U.S. Pat. No. 2,022,991 for an ALARM TRANSMITTING SYSTEM discloses an early use of radio in an alarm system. Switches concealed about the protected premises, or even concealed upon the person of an employee, are connected by wires, usually telephone lines, to a central alarm office. Upon the receipt of an alarm resultant from a switch closure at the central alarm office, an associated one telegraph phone reproducing unit is activated so as to broadcast predetermined instructions over a radio transmitter. These predetermined instructions direct a particular police car, assigned to the neighborhood from which the alarm has been received, to proceed to the premises or person upon which the alarm system has been activated. An early attempt showing the use of radio, and an attempt to discriminate between the message and the response thereto, is shown.

U.S. Pat. No. 2,989,621 for FIRE ALARM SYSTEM USING A PLURAL OSCILLATOR RADIO TRANSMITTER to P. M. Barton, et al., shows a fire alarm system using radio rather than wired communication for transmitting alarms from a multiplicity of alarm boxes to a central receiving center. The signals broadcast by the different transmitters within the same alarm system are modulated with different audio tones so that the particular alarm box from which each signal has been sent may be identified. The possibility that more than one alarm may be simultaneously active is encompassed by providing that the number of alarm boxes within each alarm unit system shall be limited to the maximum number of separately and identifiable audio tones, or tone combinations, that can be transmitted within a radio frequency channel. At the preferred operational frequency of 2250 to 2700 kilocycles per second, preferred radio channel band width of 10 kilocycles, and preferred modulation frequency of 400 to 4000 cycles in 100 cycles per second increments, some 37 different audio tones, or 37 alarm boxes, are available per unit system. This modest number, already emplacing a very demanding requirement upon the human ear which must discriminate all combinations of the multiple signals, is evidence of prior art problems with analog (audio frequency) modulation of radio alarm signals, and with the possible interference between such signals.

U.S. Pat. No. 3,256,517 for a REMOTE ALARM SYSTEM WITH SCANNING BY TONES to T. Saltzbert, et al., shows the use of a single transmission channel for a plurality of alarms on a time-shared basis. Particularly, communication via radio link between the remote alarm points and the central stations is bidirectional. The central station transmits interrogations to the remote locations in sequence by use of an addressing code, typically three tones of different frequencies. Each terminal equipment at the remote location responds only to its unique address, and transmits alarm information if and when interrogated. A bidirectional communication system of this nature increases cost. It incurs some latency between the time that an alarm may actually be sensed at a remote station and the later time at which the central station may interrogate the remote station to receive notification of the alarm.

U.S. Pat. No. 3,440,635 for POLICE ALARM to H. B. Hull discloses the use of portable radio transmitters which send coded signals that are received centrally by receivers equipped with direction finding capability. The direction finding equipment is sensitive to transmission of a signal at a particular frequency allocated for this purpose. The allocated carrier frequency may further be modulated with a tone of a particular frequency i.e., it may be encoded, in order to determine the location of the transmitter with increased accuracy. It is contemplated that the number of alarm transmitters, and users, will be small.

U.S. Pat. No. 4,630,035 for ALARM SYSTEM HAVING ALARM TRANSMITTER IDENTIFICATION CODES AND ACOUSTIC RANGING to Stahl, et al., describes an alarm system having a plurality of alarm units each transmitting an identification code. In some systems the alarm transmitters transmit the identification codes to a central control indirectly through one or more transponders. The transponders can also be assigned an address code, and can relay both the alarm transmitter identification code and their own address code to the central control when an alarm condition exists. The alarm units can generate, and the transponders can receive, an audio, as well as a radio, signal in order to aid in positional location of the alarm unit upon the occasion of an alarm.

Prior art telecommunications and telemetry systems for the automated transmission of alarms do not generally address the problem of multiple simultaneous transmissions. This is acceptable because the occurrence of alarms is normally very infrequent. Additionally, the emergency resource which may be provided in response to one or more alarms is usually limited, and it is of little consequence that later, successive, alarms should fail to be recognized if there is no remaining emergency resource to be dispensed in response to such alarms.

A contrary situation exists in a telecommunications, or telemetry, system for the registration of service requests, such as request for transportation services, particularly taxicabs. The number of service requests both per unit time, and at certain peak periods, would be expected to be very large. A number of service requests would normally be expected to be simultaneously, or nearly simultaneously, registered at distributed call boxes each of which is capable of initiating a service request. Finally, a large number of discrete resources, such as taxicabs, are normally available to be applied to the plurality of concurrent service requests. It is therefore useful that no service request should fail to be recognized even though a large system, entertaining many service requests from many distributed call boxes, should use but a single, narrow bandwidth, radio communications channel.

The present invention offers a solution to the telecommunications system problem for reliable registration, communication, and response to multiple asynchronous service requests (particularly transportation service requests, particularly requests for taxicabs). A prior art approach remotely analogous to the solution of the present invention is represented by wired communication channels within and between computers. Particularly, the well-known Ethernet communications channel employing microwave frequency digital communication between discrete points on a coaxial cable accords that a number of interconnected points may each asynchronously attempt to communicate with one or more additional points. In the event that two communications are simultaneously, or nearly simultaneously, initiated, then the receivers at all communicating locations are capable of detecting a collision situation on the communication channel, or coaxial cable. This detection of a collision, or conflict, condition, is based on energy levels. The detection is performed by the transmitting, as well as the receiving, units. In the event of any detection of a conflict, then both transmitting units will cease their attempted communications, and will wait a variable interval of time before asynchronously reinitiating such communications. Since the communications periods typically occupy but a small percentage of the total elapsed time, the stagger-staged communication between transmitting units usually accords that all messages will ultimately flow without conflict on the single communications channel.

It is inappropriate to adapt energy level sensing in order to detect communication conflicts, such as energy level sensing is performed upon an Ethernet communication net, to free space, radio, communication. Particularly, the strength of a radio signal, or signals, may vary in accordance with transmitters' separation(s), transmitters' power(s), and atmospheric conditions. It is unreliable to attempt to determine whether two or more radio transmitters are simultaneously active solely by the sensing of the radio frequency power density.

Alternatively, a full handshake communication system wherein the receipt of all messages is positively acknowledged is also inappropriate. Such a system is more costly resultantly from the use of bidirectional, as opposed to unidirectional, communication links.

The present invention will be seen to permit reliable, fully automated, communication of many independently originated, and asynchronously timed, messages upon a single radio communication channel without incurring either (i) the loss of messages or (ii) a large hardware overhead to ensure message receipt.

SUMMARY OF THE INVENTION

The present invention is embodied in a telemetry system for the remote registration of requests for services at, and to, a central dispatch point for such services. The invention is also embodied in a method of using such a telemetry system.

In accordance with one aspect of the present invention, the communication, and the communications' processing, within the telemetry system is entirely digital. A plurality of call boxes each asynchronously transmits an individually unique digital code as services are requested. A central station receives the digital codes which are at times generated from the call boxes, and digitally processes the codes so as to produce a display intelligible to a human. The human dispatches a particular requested service to a particular requesting call box location. In accordance with the present invention, the transmitting and the receiving of the digital codes is preferably by radio, the processing of such digital codes is preferably by a digital computer, and the display of messages is preferably on a computer monitor and/or printer. The radio communication of digital identification codes is preferably by Frequency Shift Keying (FSK), preferably by a Bi-Phase Modulated (Bi-Phase-M) digital code, and the FSK Bi-Phase-M digital identification code is preferably redundant for data security during transmission and reception.

Further in accordance with the digital communication and processing aspect of present invention, the unique digital codes that are transmitted by each of the call boxes and received by the central station include both (i) an encoded identification of the individual call box that is transmitting the unique digital code, and (ii) a further encoded representation of a single message, one of a plurality of possible messages that are at different times transmitted from the call box responsively to different stimuli. The particular, preferred, messages that are encoded, and communicated, by the telemetry system in accordance with the present invention constitute a preferred method for the use of such system. The digitally encodable messages include one or more of the following:

(1) a manually generated request for transportation services, particularly a taxicab;

(2) an automated message indicating an abnormal condition, particularly including the abnormal conditions of motional perturbations attendant upon vandalism to the call box or a low power condition at the call box; and (3) a periodic status report message in order that the on-line operational integrity of the call box may be verified.

In accordance with another aspect of the present invention, the telemetry system is improved in operation for recognition of plural messages when more than one is asynchronously transmitted at the same time. When communication's telemetry occurs, as is preferable for being economic of both equipments' costs and the radio spectrum, upon a single narrowband radio channel, then the messages of a plurality of asynchronously operative call box transmitters may, and generally do, overlap in time and frequency. This overlap, or conflict, causes improper reception of conflicting messages at the central receiver. In accordance with the present invention, this message conflict is dealt with by causing that each of the plurality of transmitters should, upon each time that it does transmit its unique identification code and accompanying message, repeat the code and message a plurality of instances, nominally three times, within a short time interval. The cumulative durations of the plural transmissions are short in relation to the elapsed, real time, interval during which redundant transmissions are made, and are pseudo randomly distributed within such interval. Furthermore, the total number of call box transmitters within a telemetry system, and the maximum probable message frequency occurring at each call box, are configured so that it is of essentially certain probability that at least one of the redundant transmitted messages from each of the call box transmitters will be received at the central receiver. Further in accordance with this preferred method of redundant message transmission, the processing of the messages at the central receiver will ignore plural redundant messages received within the time interval during which the messages are redundantly transmitted.

In accordance with still another aspect of the present invention, the telemetry system is improved in the manner by which a positive response is given to a person registering a service request at one of the distributed call boxes. This positive feedback response to an initiated service request is efficiently without any involvement of the central station, and is efficiently without any communication from the central station to the call box, whatsoever. The present invention thusly obviates that the central station should incur the cost of a radio transmission capability, and that the call boxes should incur the cost of a radio reception capability. Particularly in accordance with the present invention, a call box is improved for providing a positive feedback response to a service request by incorporating a time delay circuit that is actuated by the user's registration of a service request. An indicator displays, after the expiration of a time delay, an indication to the user that the service request is acknowledged. In point of fact, the service request has been acknowledged, at least at the call box. However, the time delayed acknowledgement may, quite justifiably and by intentional design, appear to the user to positively indicate that some remote (time distant) agency, human or otherwise, has taken note of, and is in the process of responding to, the registered service request. With an acceptably high degree of certainty, this is indeed the actual case in the present automated telemetry system employing redundant message transmissions. The probability that a service request should be lost and that the positive feedback response to the initiator shall have been provided falsely is minute in relationship to other occurrences, such as traffic accidents, which routinely impede proper delivery of the requested service (normally taxicab transportation services) to the requesting user. Therefore the telemetry system in accordance with the present invention clearly renders a positive feedback response that is highly economical of generation while still being adequate, and normally highly accurate, so as to satisfy the user's concern that his/her request shall have been received, and is being acted upon.

DESCRIPTION OF THE PREFERRED EMBODIMENT

The telemetry system in accordance with the present invention is particularly directed to the digitalized communication and processing of service requests, particularly via digital radio and digital computers. The service requests that are digitally communicated and processed are asynchronously originated at ones of a large number of CALL BOXES. The nature of the service requests are, for example, to summon taxicab services and the CALL BOXES are situated at locations typically serviced by taxicabs. The CALL BOXES are particularly designed to be easily operated by the general public, and to give the operator-user a positive confirmation that the call has been made. The CALL BOXES are additionally capable of originating other digitally encoded messages including (i) disruption of the physical integrity of the CALL BOX by vandalism, (ii) low battery conditions, and (iii) periodic indications of operational integrity.

The digital messages that are asynchronously generated at ones of the CALL BOXES potentially conflict with each other on a single narrow band radio channel over which they are communicated, and prevent proper message reception at the central receiver. In order that each independent and asynchronous message and should be reliably received, each message transmission is repeated, typically three times. The duration, frequency of occurrence, and time separation of the repeated messages is such so as to ensure with a high probability that each message will be correctly received.

The digital messages are centrally received in a MASTER RECEIVER, or digital radio. The digital messages are then processed in a COMPUTER, typically a personal computer, operating under software program control. The computer processing of the messages allows recognition of valid, newly initiated, service requests while any extra copies of any one message which have been received due to redundant transmissions are discarded. The COMPUTER normally displays each incipient message requesting service to a human operator, who, responsively to the message, dispatches the requested service (typically a taxicab). The visual and printed displays of the computer are additionally capable of being provided directly to the attention of the service providers (the taxicab drivers) at some central dispatching location, or at remote locations if desired. The processing of, and optionally each response to, the service requests is cataloged. Cumulative records provide statistical information about system operation and the provisioning of services.

Figure 1:
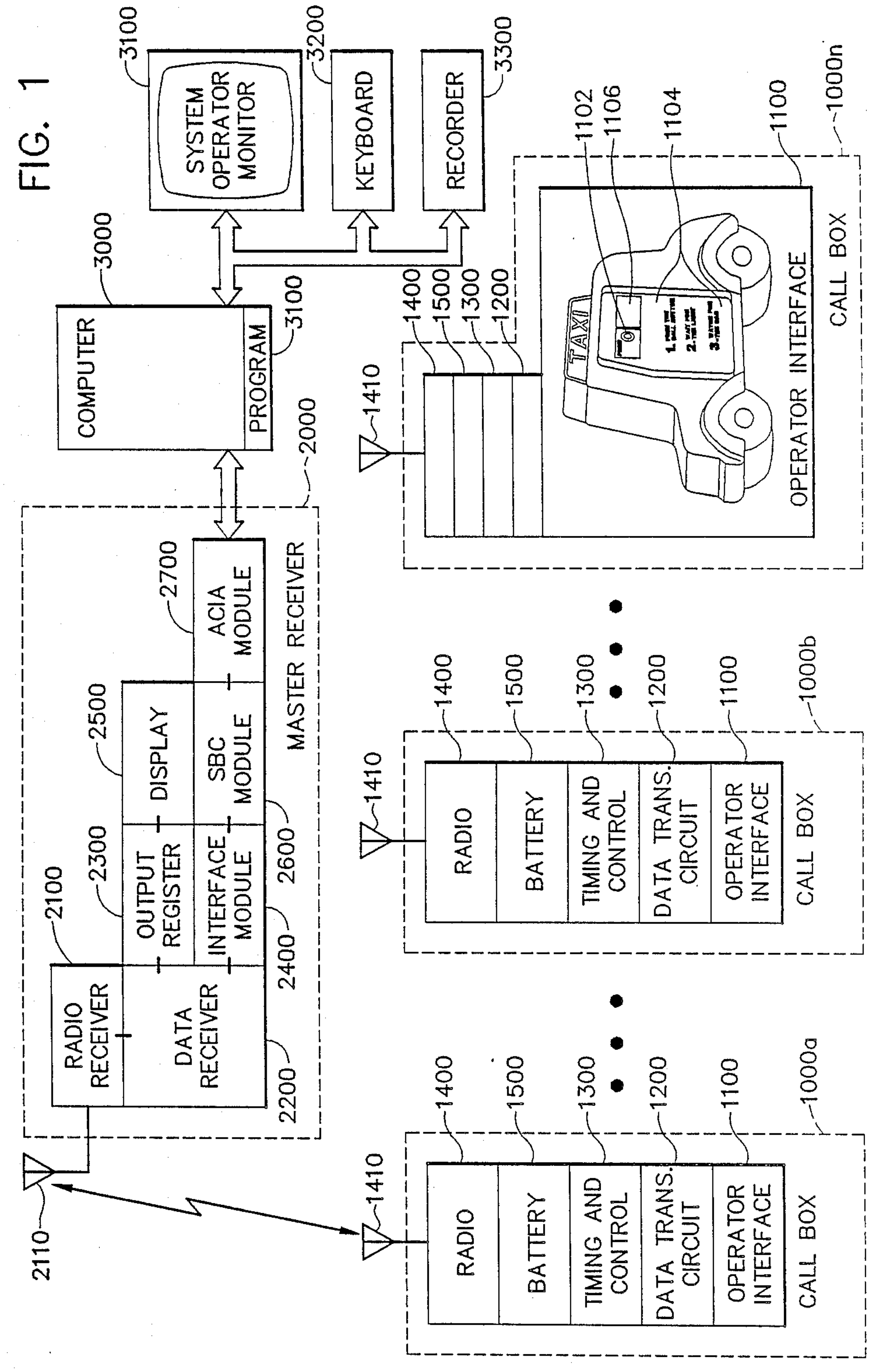
FIG. 1 is a first level schematic block diagram showing the telemetry system in accordance with the present invention.

A first level schematic block diagram of the telemetry system in accordance with the present invention is shown in FIG. 1. A number of identical or substantially identical remote units, or CALL BOXES, 1000*a* through 1000*n* are geographically distributed. Each CALL BOX 1000 is battery powered for the transmission of digital radio messages, as is diagrammatically illustrated to transpire between CALL BOX 1000 and centrally located MASTER RECEIVER 2000.

One particular type of digital message typically transmitted by a CALL BOX 1000 is a manually initiated service request, typically a request for taxicab transportation services. The human registration of this service request is supported by the section OPERATOR INTERFACE 1100 of CALL BOX 1000. As is most particularly shown in detail for CALL BOX 1000 illustrated in FIG. 1, this section OPERATOR INTERFACE 1100 presents a convenient, simple, and friendly interface to the user. This OPERATOR INTERFACE 1100 is graphically identified to be a Taxicab Call Box, or the like, and typically consists of a brightly colored plastic bas-relief model of a taxicab. The sole user control is a brightly colored and illuminated push button switch 1102 prominently labeled "PUSH". Directions for user operation are prominently displayed in an area 1104 adjacent the push button switch 1102. Such directions may be, for example, "1. PUSH THE CALL BUTTON, 2. WAIT FOR THE LIGHT, [and] 3. WATCH FOR THE CAB". Graphical symbols such as a depiction of a finger pushing the call button, a representation of a "CAB DISPATCHED" light, and a representation of a person being picked up by a taxicab may respectively accompany the directions 1. through 3. At a predetermined time delay after the user presses the push button switch, the CAB DISPATCHED light 1106 will come on to indicate to the user that a taxicab has been dispatched. In actual fact this message only represents a highly probable occurrence, and it may be slightly premature in time to that actual instance when a cab is ultimately dispatched in response to the user's request. Nonetheless, the request-initiating user is pacified by the timely response to his/her service request while the system is constructed so as to allow reliable recognition of the registered request, and so as to permit reliable delivery of the requested service.

When the user depresses the push button switch 1102, a sequence of events occur within the CALL BOX 1000 resulting in transmission of a digitalized message via radio frequency (rf) signal. A DATA TRANSMITTER CIRCUIT 1200 and a TIMING & CONTROL circuit 1300 are involved in the generation of this, and additional, messages. A RADIO TRANSMITTER 1400 produces the radio frequency signal that is encoded in accordance with the digital message. A BATTERY 1500 provides power to other electronic assemblies within the CALL BOX 1000. Each message from each CALL BOX 1000A–1000N contains a uniquely coded segment which indicates which particular one of the CALL BOXES 1000A through 1000N originated the message.

The centrally located equipments of the telemetry system in accordance with the present invention include a MASTER RECEIVER 2000 and a COMPUTER 3000 plus associated computer peripherals 3100–3300. The MASTER RECEIVER 2000 consists of a RADIO RECEIVER 2100 plus additional receiver components 2200–2700 that allow decoding of the received digital messages. Particularly, the RADIO RECEIVER 100 receives the radio frequency signal and provides an audio tone output to the DATA RECEIVER 2200. The DATA RECEIVER 2200, OUTPUT REGISTER 2300, INTERFACE MODULE 2400, DISPLAY 2500, SBC MODULE 2600, and ACIA MODULE 2700, decode the digital data from the received audio tone, and send the digitalized information to the COMPUTER 3000.

The COMPUTER 3000, normally of the IBM-XT or compatible types, operates under a control of a PROGRAM 3100 that resides in the memory stores of COMPUTER 3000 during normal system operation. The programmed operation of COMPUTER 3000 receives incoming digital messages from MASTER RECEIVER 2000, recognizes new messages, decodes the messages into quantities intelligible to humans (i.e., remote unit number and address, time of day, etc.) and causes display of these quantities on an operator interface, typically the SYSTEM OPERATOR MONITOR 3100. A system operator monitoring the quantities decoded from the messages may communicate with the computer for the logging responses to such messages via KEYBOARD 3200. The COMPUTER 3000 logs all received messages, and system operator response thereto, on RECORDER 3300, typically a flexible disk or a hard disk, for later statistical data processing and in order to provide a historical record of system operation.

Figure 2:
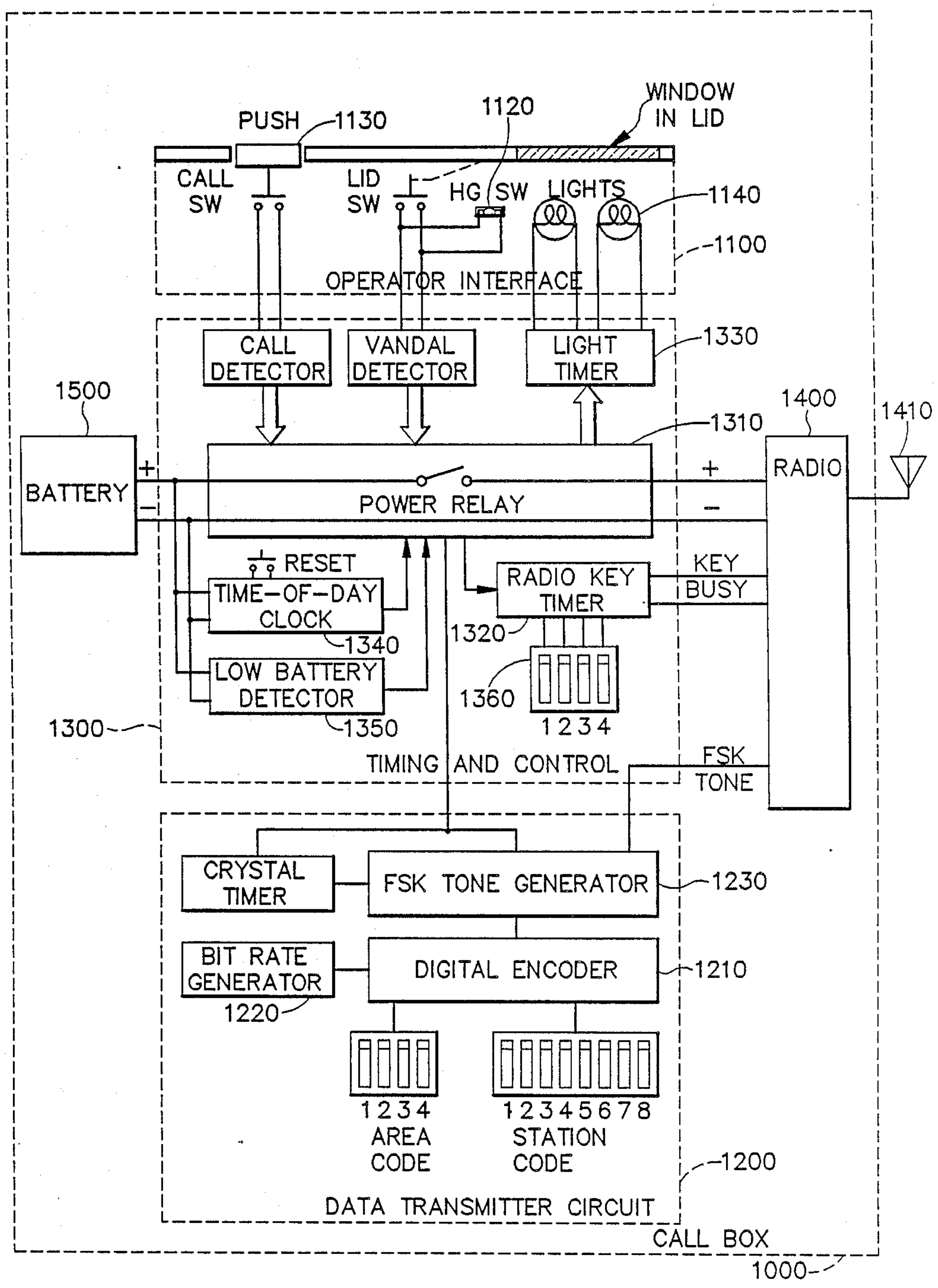
FIG. 2 is a second level schematic block diagram showing the CALL BOX component of the telemetry system in accordance with the present invention.

A second level electrical schematic block diagram of the CALL BOX 1000, previously seen in FIG. 1, is shown in FIG. 2. When the faceplate lid (not shown) to the OPERATOR INTERFACE 1100 is opened, an abnormal occurrence usually resultant only during maintenance then the switch LID SW is closed causing a signal to be sent to POWER RELAY 1310. Meanwhile, a tilting or other physical disruption of the CALL BOX 1000 apparatus will cause closure of mercury switch HG SW 1120 providing a like signal to POWER RELAY 1310. It is for this reason that both the lid opening and the mercury switch signal are labeled VANDAL DETECTOR. Also received at POWER RELAY 1310 is a CALL DETECTOR SIGNAL resultant from the depression, or PUSH, of CALL SW 1130. Each of the CALL DETECTOR or the VANDAL DETECTOR signals causes the POWER RELAY 1310 to close, applying power from BATTERY 1500 to both RADIO 1400, DATA TRANSMITTER CIRCUIT 1200, and to the RADIO KEY TIMER 1320 of TIMING AND CONTROL 1300. The power from BATTERY 1500 is also provided through POWER RELAY 1310 to the LIGHT TIMER 1330. The LIGHT TIMER 1130 is a simple circuit gating power to LIGHTS 1140 after a predetermined time interval, typically a few seconds to 30 seconds. Illumination of the LIGHTS 1140 causes a message, typically "CAB DISPATCHED" to be visible within the WINDOW IN LID of OPERATOR INTERFACE 1100.

Continuing in FIG. 2 the TIME-OF-DAY-CLOCK 1340, which is resettable by the RESET switch, always receives power from BATTERY 1500. The clock is a simple elapsed time indicator providing an enablement signal for closure of POWER RELAY 1310 after a predetermined elapsed period, typically one day. Likewise, the LOW BATTERY DETECTOR 1350 also always receives power from BATTERY 1500. It provides a signal to POWER RELAY 1310 when a low power condition is sensed. The basic sequence by which all message transmissions are initiated is the same: basically the energization of the CALL BOX 1000 by closure of the POWER RELAY 1310, plus provision of such discreet control signals (not shown) to DIGITAL ENCODER 1210 as will permit the generation of a unique message.

Particularly, when power is applied through POWER RELAY 1310 to the DATA TRANSMITTER CIRCUIT 1200, a 16 bit digital code is generated. This code contains 4 binary bits, set or cleared in accordance with switches 1–4 AREA CODE, that represent the digitally encoded geographical area within which the particular CALL BOX 1000 is located. The code contains 8 bits, set or cleared by switches 1–8 STATION CODE, representing the unique identity of the particular CALL BOX 1000 within this particular area. It may thusly be recognized that up to $2^{4+8}$ or $2^{12}$, i.e., 4096 different individual CALL BOXES 1000 may be uniquely identified. The remainder of the 16 bit digital code includes 1 bit representing a service request, or a CALL CODE; 1 bit representing the occurrence of vandalism, or a VANDAL CODE; 1 bit representing a low battery condition, or a LOW BATTERY CODE; and 1 bit representing a periodic message, or STATION REPORT CODE, generated responsively to the TIME-OF-DAY-CLOCK 1340. In response to a fixed frequency signal generated by the BIT RATE GENERATOR 1220, the DIGITAL ENCODER 1210 provides the 16 bit code to the frequency shift keyed FSK TONE GENERATOR 1230 to enable generation of a bi-phase modulated (Bi-Phase-M) digital code. The FSK Bi-Phase-M Digital Code, repeated for data security, is received as signal FSK TONE at RADIO 1400.

It is obvious that the message need not be limited to sixteen bits, that other and/or further meanings could be ascribed to existing and/or further message bits, and/or the information transmitted need not have unitary correspondence with the bits of the message but could instead be encoded into numerical values. The sophistication of message generation and informational encoding at the CALL BOX 1000 may readily be manipulated by a practitioner of the digital electronic arts. The preferred embodiment of the CALL BOX 1000, and the meanings ascribed to the message transmissions, may be varied while still conforming to the principles and spirit of the present invention.

The RADIO 1400, which now has power from BATTERY 1500 via POWER RELAY 1310, will transmit a radio frequency signal containing the information of signal FSK TONE via ANTENNA 1410 upon such times as signal BUSY received from RADIO KEY TIMER 1320 indicates "not busy". At such time as signal BUSY from RADIO KEY TIMER 1320 indicates "busy", then the RADIO 1400 will wait before retransmitting the information contained in signal FSK TONE. The RADIO KEY TIMER 1320 is controllable to produce a pseudo random delay by switches 1–4 1360. It is enabled to generate a predetermined number, typically 3, successive elapsed time intervals by closure of POWER RELAY 1310. The effect of the gated control of RADIO 1400 by the RADIO KEY TIMER 1320 for transmission of the information contained in signal FSK TONE effectively means that a predetermined number, typically 3, complete messages will be transmitted. Each message will have an actual "on-the-air" transmission time of 0.5 to 1 seconds. The overall telemetry system in accordance with the present invention employs that number of CALL BOXES 1000, and incurs that expected peak period message frequency at each call box, so as to permit that at least some ones of the (typically 3) redundant messages transmitted through RADIO 1400 during any pseudo random period will be correctly received at MASTER RECEIVER 2000 (shown in FIG. 1). At least one transmission of each independent asynchronously generated message from each simultaneously transmitting CALL BOX 1000 will be correctly received at centralized MASTER RECEIVER 2000 (shown in FIG. 1) even if some other ones of the message transmissions are not correctly received due to conflict, or overlap, between competing messages.

As well as enabling the energization of LIGHTS 1140, and the display of the message through the WINDOW IN LID, the LIGHT TIMER 1330 will cause that the lights are extinguished and that the POWER RELAY 1310 is disabled (by a signal the path of which is not shown) after a predetermined period, nominally about 1 minute since CALL SW 1130 was first pushed. Only after the LIGHTS 1140 have gone out, and after the POWER RELAY 1310 has been de-energized, can a new call originating at CALL BOX 1000 be registered. Prior to this time, if the operator user continues to push CALL SW 1130, then it will be considered that the successive actuations represent the same request originating with the same user, and no additional message will be dispatched. Such plural successive message transmissions (not counting the redundancy of each message transmission) as come to be dispatched from the CALL BOX 1000 may still be subject to an independent, autonomous, reasonableness and validity assessment by the telemetry system operator when the received messages are displayed on SYSTEM OPERATOR MONITOR 3100. In other words, a large number of closely time proximate messages originating at a signal CALL BOX 1000 may, or may not, represent an equivalent number of independent service requests.

Figure 3:
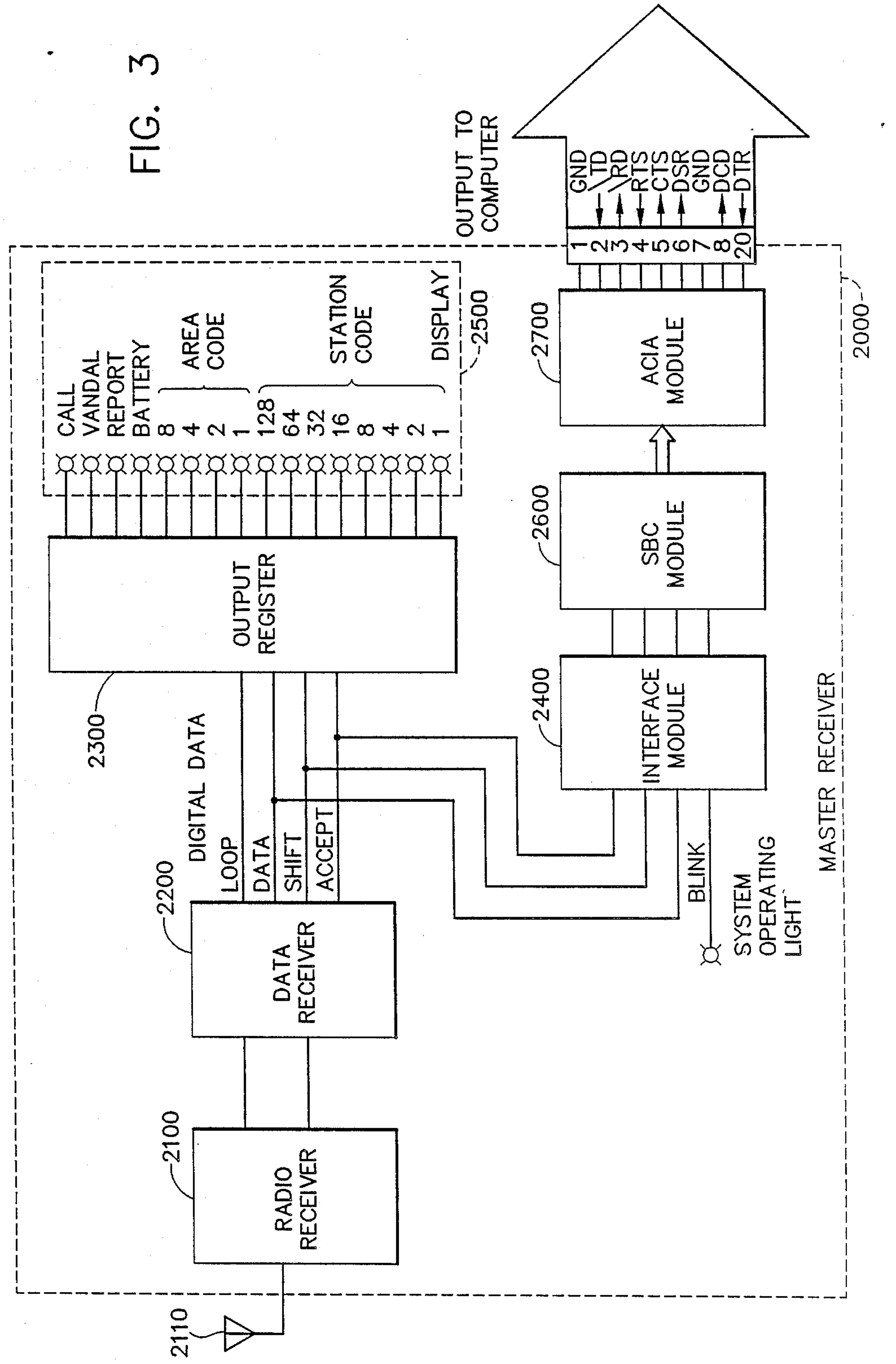
FIG. 3 is a second level block diagram showing the MASTER RECEIVER component of the telemetry system in accordance with the present invention.

A second level electrical schematic block diagram of MASTER RECEIVER 2000, previously seen in FIG. 1, is shown in FIG. 3. The RADIO RECEIVER 2100 receives the encoded digital radio signals originating at ones of the CALL BOXES 1000 via ANTENNA 2110. It converts the received radio frequency (rf) signal into tone information that is presented to the DATA RECEIVER 2200. The DATA RECEIVER is tuned to receive the particular frequency shift keyed (FSK) frequency tone that was generated by the DATA TRANSMITTER CIRCUIT 1200 of the REMOTE CALL BOXES 1000 (shown in FIG. 2). This tone typically has a center frequency of 2500 Hz and is shifted in accordance with binary message information by 100 Hz. The DATA RECEIVER 2200 is matched for decoding of the correct frequency, bit rate, and word length (typically 16 bits) that was generated by the DATA TRANSMITTER CIRCUIT 1200 of the REMOTE CALL BOXES 1000.

In response to the receipt of the FSK Tone from the RADIO RECEIVER 2100, the DATA RECEIVER 2200 produces a serial binary data string of 16 bits plus 2 end-of-word bits. This serial data string is validated for bit count, valid data bits, frequency, etc., and sent in parallel to the OUTPUT REGISTER 2300 and the INTERFACE MODULE 2400. The bit seal transmission transpires as signal DATA under control of shift pulses presented as signal SHIFT. The delayed signal DATA is looped back through the DATA RECEIVER 2200 from the OUTPUT REGISTER 2300 as signal LOOP. The LOOP signal feeds the bit serial data string representing the first message, or word, back into the DATA RECEIVER 2200 in order that it may be compared with a second message, or word, on a bit-by-bit basis. If, and when, successive messages are identical, then a pulse is transmitted as signal ACCEPT. This pulse is used to store the previously transmitted data in both the OUTPUT REGISTER 2300, and the INTERFACE MODULE 2400. This bit-by-bit comparison of an entire message, or word, constitutes a double scan of the data transmission. It is performed on all received messages. This redundancy helps to insure integrity of message transmission.

When the OUTPUT REGISTER 2300 receives the ACCEPT signal pulse, then the OUTPUT REGISTER 2300 is enabled for selectively illuminating respective indicators of DISPLAY 2500 in accordance with the message data stored within OUTPUT REGISTER 2300. The indicators are primarily for system maintenance and test purposes, and are not normally involved in system operation. System operation and control is normally performed via COMPUTER 300 (shown in FIG. 1).

The digitalized bit serial message received at INTERFACE MODULE 2400 is further passed to standard SBC MODULE 2600 and interface module ACIA MODULE 2700. The SBC MODULE 2600 and its companion ACIA MODULE 2700 produce an RS-232C interface signal containing the message information. This RS-232C interface signal information is transmitted as signal OUTPUT TO COMPUTER, which signal is routed to COMPUTER 3000 (shown in FIG. 1).

Figure 4:
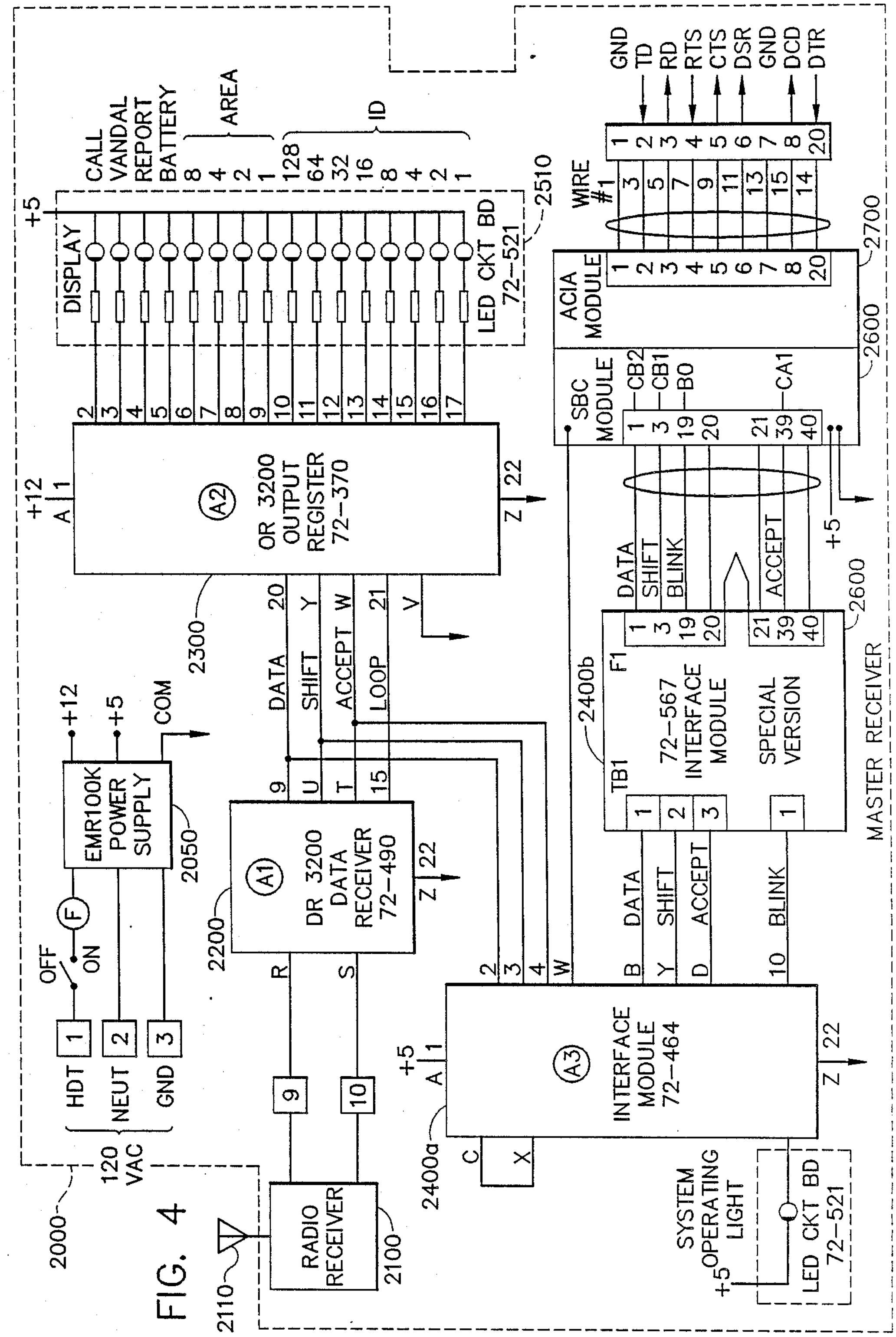
FIG. 4 is a third level block diagram showing in greater detail the MASTER RECEIVER component of the telemetry system in accordance with the present invention.

A more detailed, second level, electrical schematic block diagram of the MASTER RECEIVER 2000 (previously seen in FIGS. 1 & 3) is shown in FIG. 4. A POWER SUPPLY 2050 supplies plus 12 v.d.c. plus 5 v.d.c. power to other modules. The signal S, and the return signal R, developed at RADIO RECEIVER 2100 are received at DATA RECEIVER 2200, typically of type DR3200 having industry standard part number 72-490. Similarly, the OUTPUT REGISTER 2300 is normally of type OR3200 having industry standard part number 72-370. The INTERFACE MODULE **2400*a* is typically industry standard part number 72-464 while the INTERFACE MODULE, SPECIAL VERSION 2400*b* is typically industry standard part number 72-567. The SBC MODULE 2600 is typically industry part number 72-567 and is tightly coupled as indicated to the ACIA MODULE 2700**, also an industry standard component.

Figure 5:
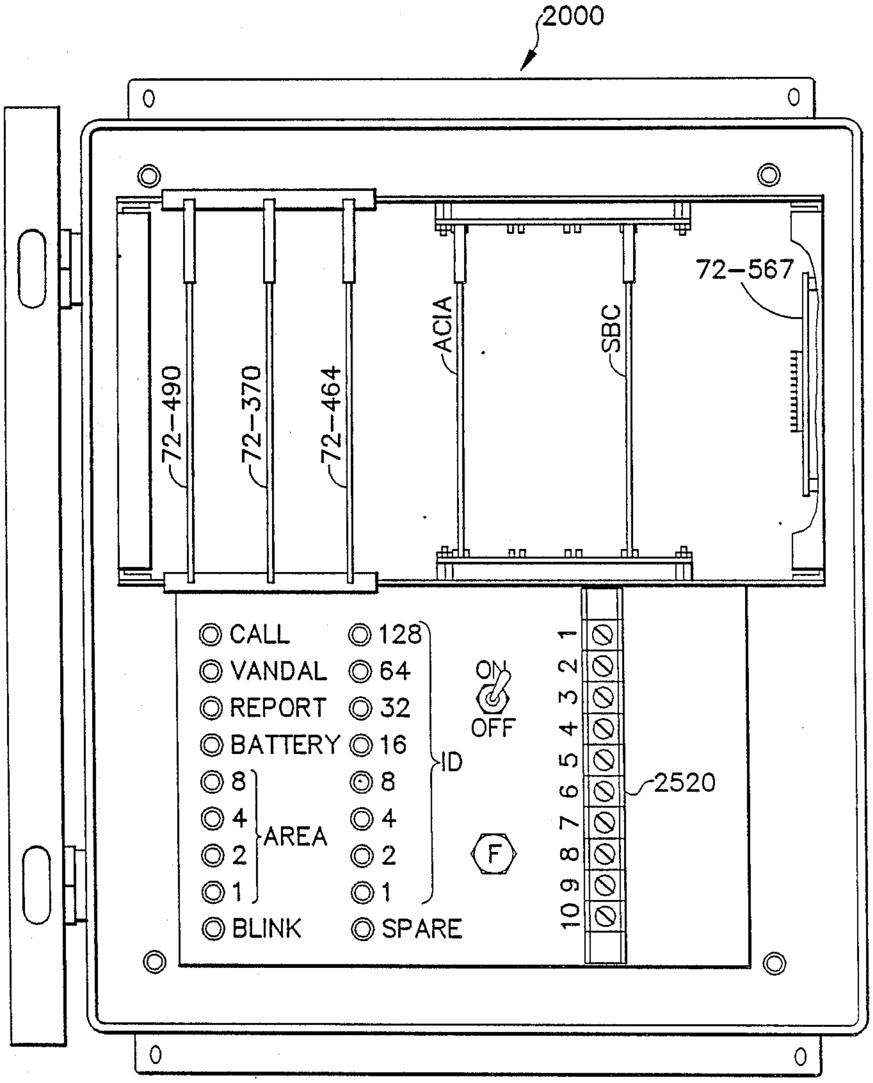
FIG. 5 is a mechanical diagram showing the preferred physical organization of the MASTER RECEIVER component of the telemetry system in accordance with the present invention.
Figure 6:
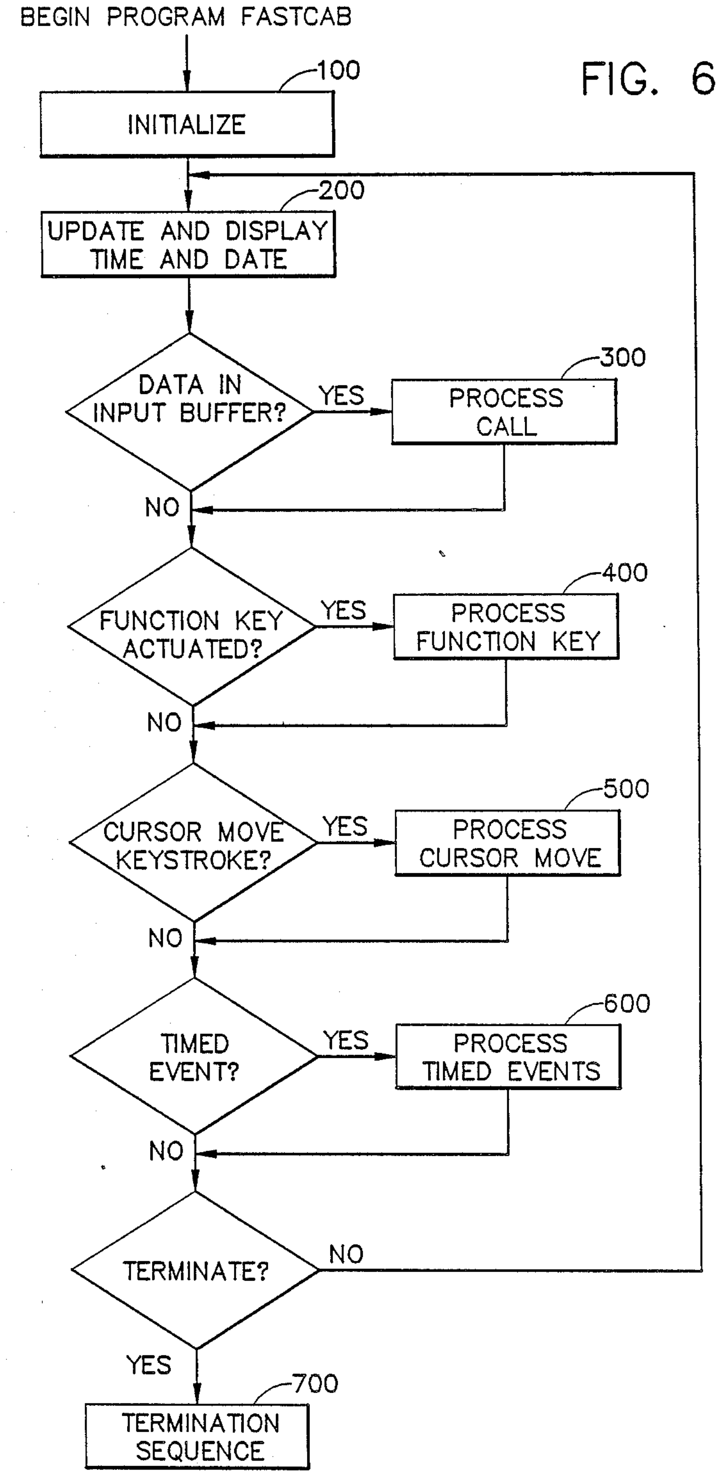
FIG. 6 is a first level program flow chart showing the program FASTCAB executed by the COMPUTER component of the telemetry system in accordance with the present invention.
Figure 7:
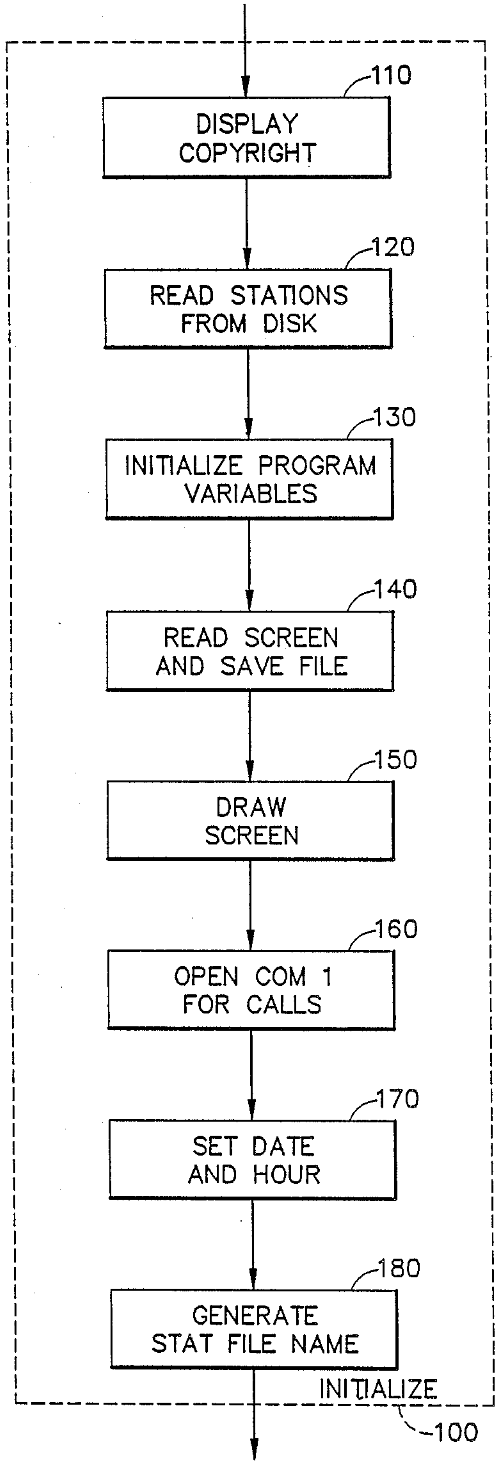
FIG. 7 is a second level program flow chart showing the routine INITIALIZE within the program FASTCAB flow charted in FIG. 6.
Figure 8:
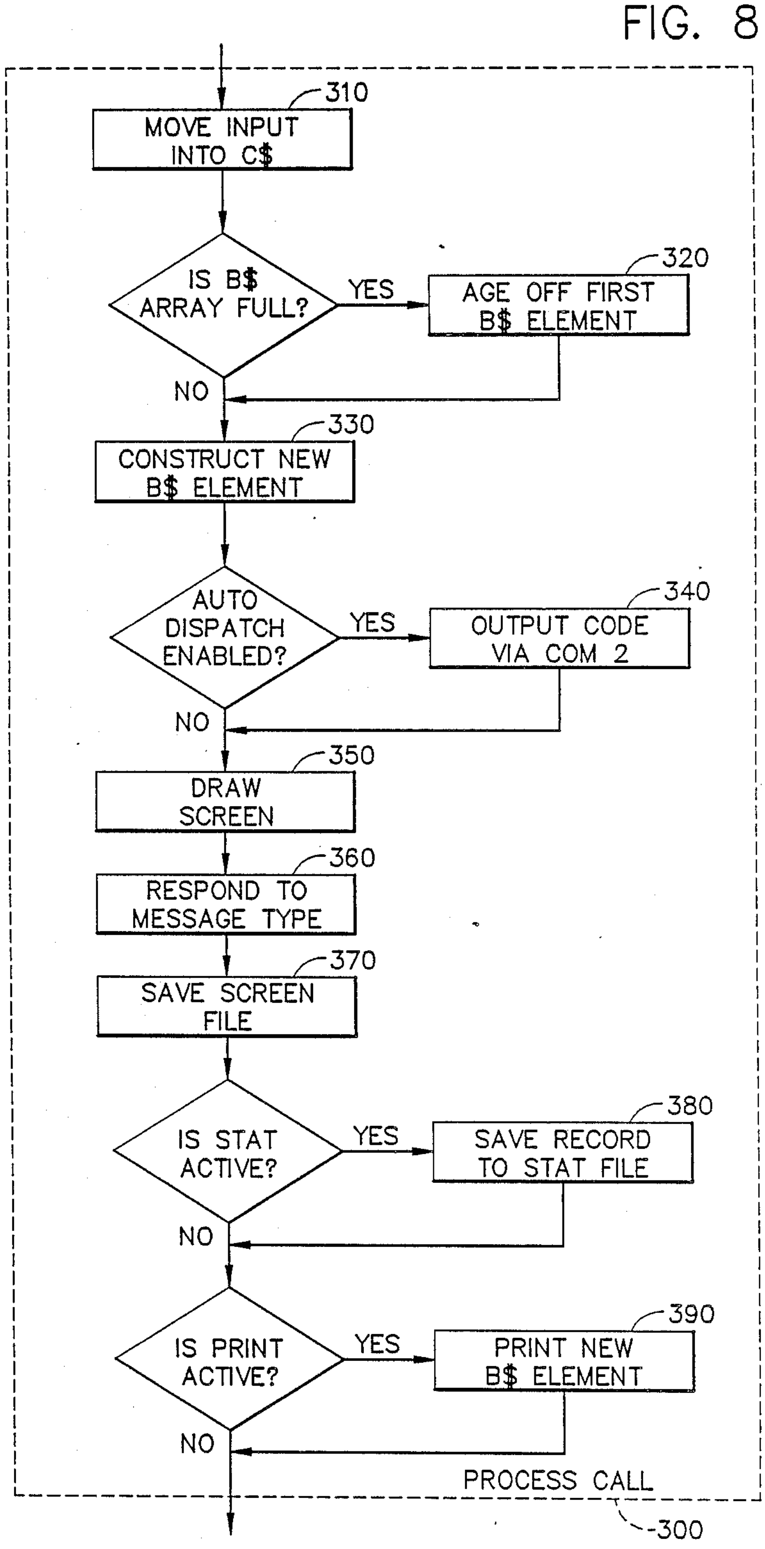
FIG. 8 is a second level program flow chart showing the routine PROCESS CALL within the program FASTCAB flow charted in FIG. 6.
Figure 9:
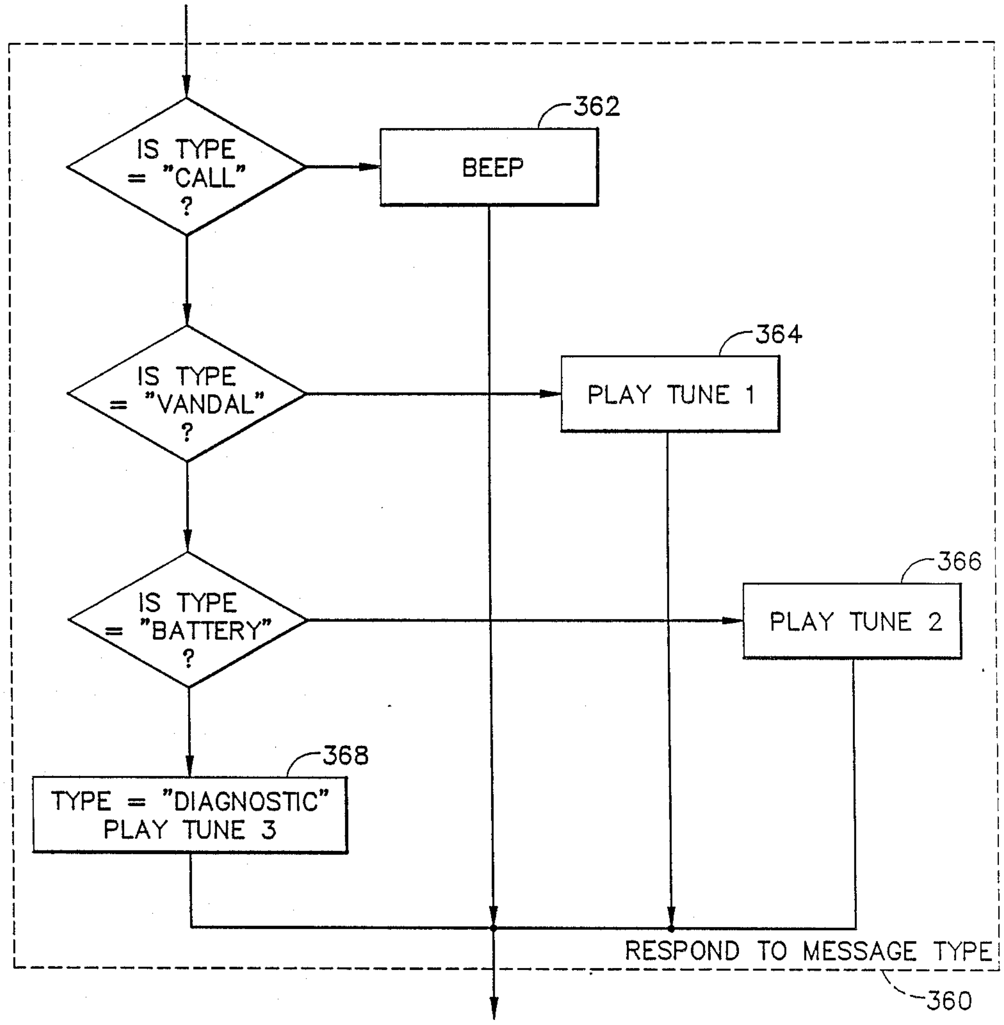
FIG. 9 is a second level program flow chart of the routine RESPOND TO MESSAGE TYPE of the program FASTCAB flow charted in FIG. 6.

A suggested physical assembly of the modules within MASTER RECEIVER 2000, with each module identified by its part number, is shown in FIG. 5. As is therein observable, provision has been made for modular construction to facilitate maintenance and repair. A DISPLAY 2500 (shown in FIG. 3), consisting substantially of LED CKT BD 2510 part number 72-521 (shown in FIG. 4), visually displays the last message received. Certain system voltages and signals are additionally bought to terminals 1–10 of terminal block 2520, as desired, to facilitate test and maintenance of the MASTER RECEIVER 2000.

Momentarily returning to FIG. 1, it may be understood that the COMPUTER 3000, typically an IBM XT or compatible type, receives in digital form via the RS-232C interface from MASTER RECEIVER 2000 most, if not all, of the messages that are from time to time originated at various ones of the CALL BOXES 1000A–1000N. The COMPUTER 3000 operates under the control of software PROGRAM 3100. The flow charts of this software PROGRAM 3100 are the, subject of FIGS. 6–19. The PROGRAM 3100 operating within the COMPUTER 3000 will be operative, amongst other functions, to eliminate redundantly transmitted messages, to display all messages on the SYSTEM OPERATOR MONITOR 3100 in order that a human system operator may respond thereto, to receive system operator inputs via KEYBOARD 3200 and to log all system activities upon RECORDER 3300 (which is typically a hard disk).

One preferred computer program for control of the telemetry system in accordance with the present invention, wherein both the program and the system are particularly directed to the provisioning of taxicab transportation services, is the program FASTCAB which is flow charted in FIGS. 6–18. After entrance into the program proceeding from a bootstrap load of the program, or after entrance under computer operating system control, and after performance of initialization in block INITIALIZE 100 shown in FIG. 6, the program conducts all data and message processing by proceeding in a major loop. Within this loop the program FASTCAB will perform routines PROCESS CALL in block 300, PROCESS FUNCTION KEY in block 400, CURSOR MOVE in block 500, and/or PROCESS TIMED EVENTS in block 600, each and all routines as required. Until the program is terminated by manual intervention or by loss of power, the TERMINATION SEQUENCE of block 700 will not be entered, and the program FASTCAB will cycle continuously.

The detailed programmed operations occurring in the routines of blocks 100–700 of program FASTCAB (flow charted in FIG. 6) are generally shown in FIGS. 6–18. For example, the routine INITIALIZE in block 100 may be observed in FIG. 7 to consist of 8 different subroutines, shown within blocks 110–180. These eight subroutines essentially amount to preliminary housekeeping before commencing on-line system operation. Similarly, the routine PROCESS CALL of block 300 is shown in greater, flow charted, detail within FIG. 8. In a like manner to the tiered, detailed, flow charting of the major routines, some subroutines are also the subject of detailed flow charts. For example a subroutine RESPOND TO MESSAGE TYPE of block 360 which is within the routine PROCESS CALL of block 300, is further expanded in FIG. 9. The flow charts are substantially self-explanatory. For reference in interpretation, it should be understood the data element C$ represents a preliminary message staging, and holding, area. The data element B$ represents the historical array (or table, or list) of received messages. It may be particularly noted in subroutine RESPOND TO MESSAGE TYPE of block 360 (shown in FIG. 9) that a particular response will be made to each different message type which is received, from time to time, from various ones of the CALL BOXES 1000 (shown in FIG. 1). As well as the particular audible effects suggested by the names of boxes 362, 364, 366, (shown within FIG. 9) it will be understood that a visual display of the decoded message is presented to the system operator upon SYSTEM OPERATOR MONITOR 3100 (shown in FIG. 1).

Figure 10A:
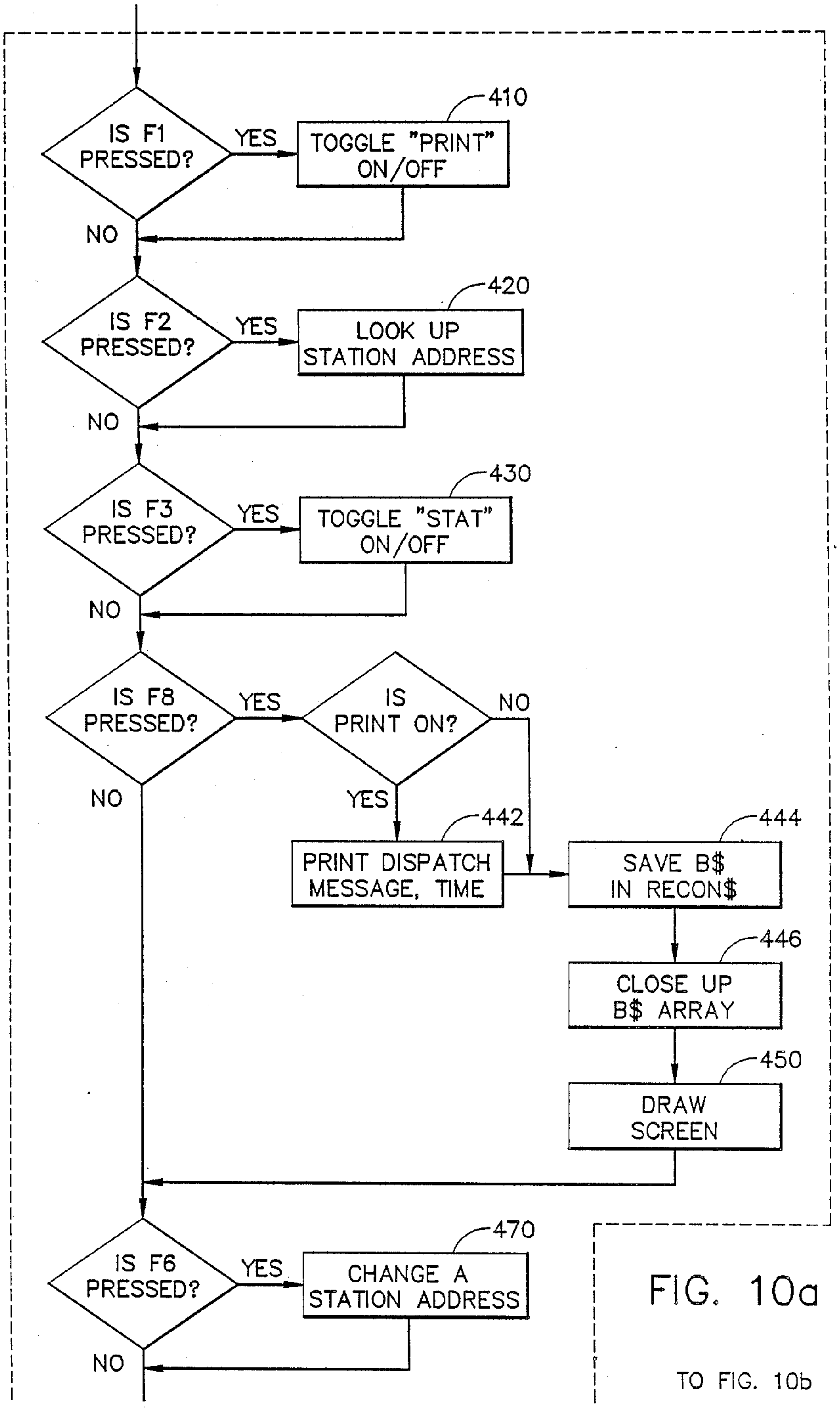
FIG. 10*a*, 10*b* is a second level program flow chart of the routine PROCESS FUNCTION KEY of the program FASTCAB flow charted in FIG. 6.
Figure 10B:
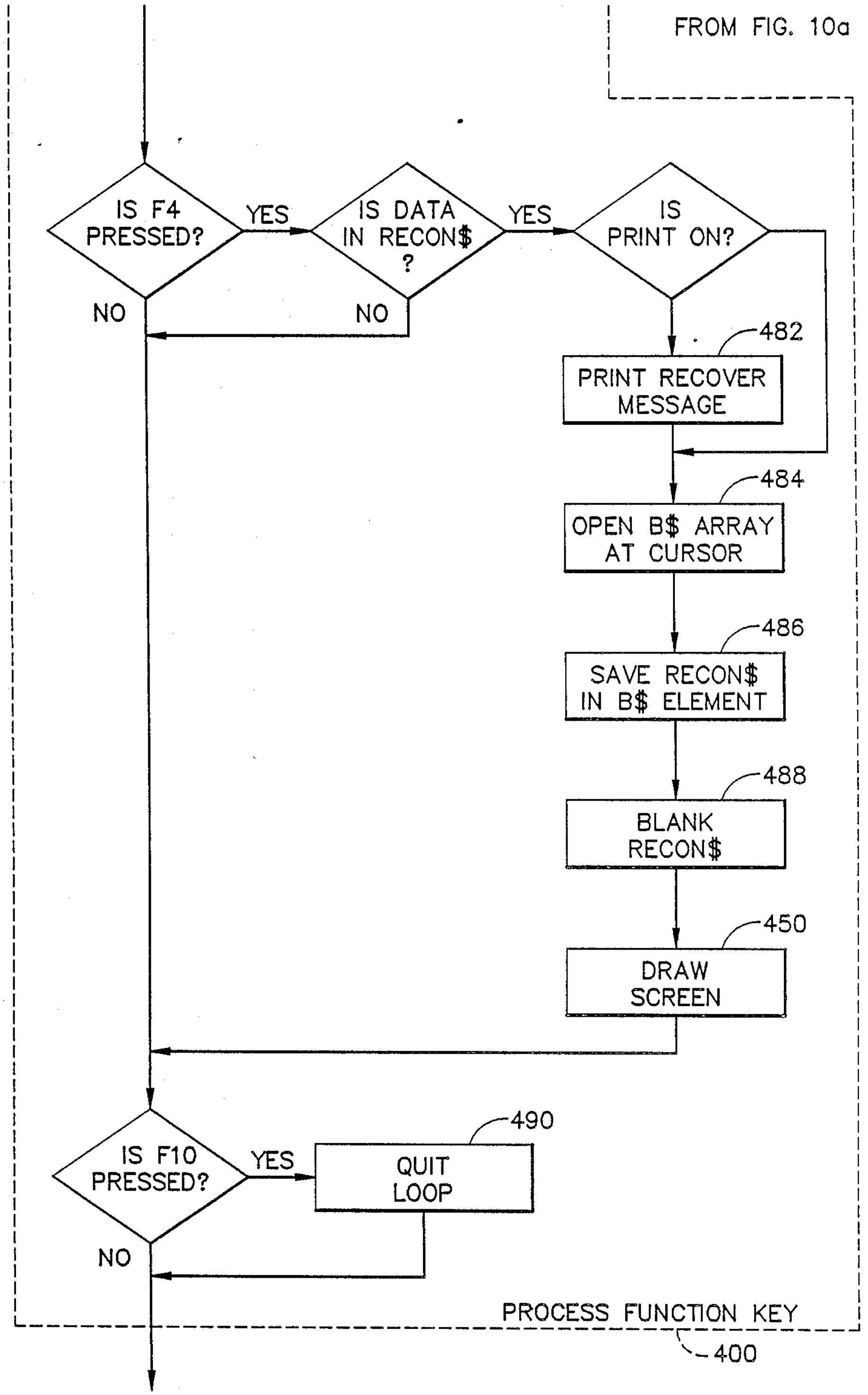
Figure 11:
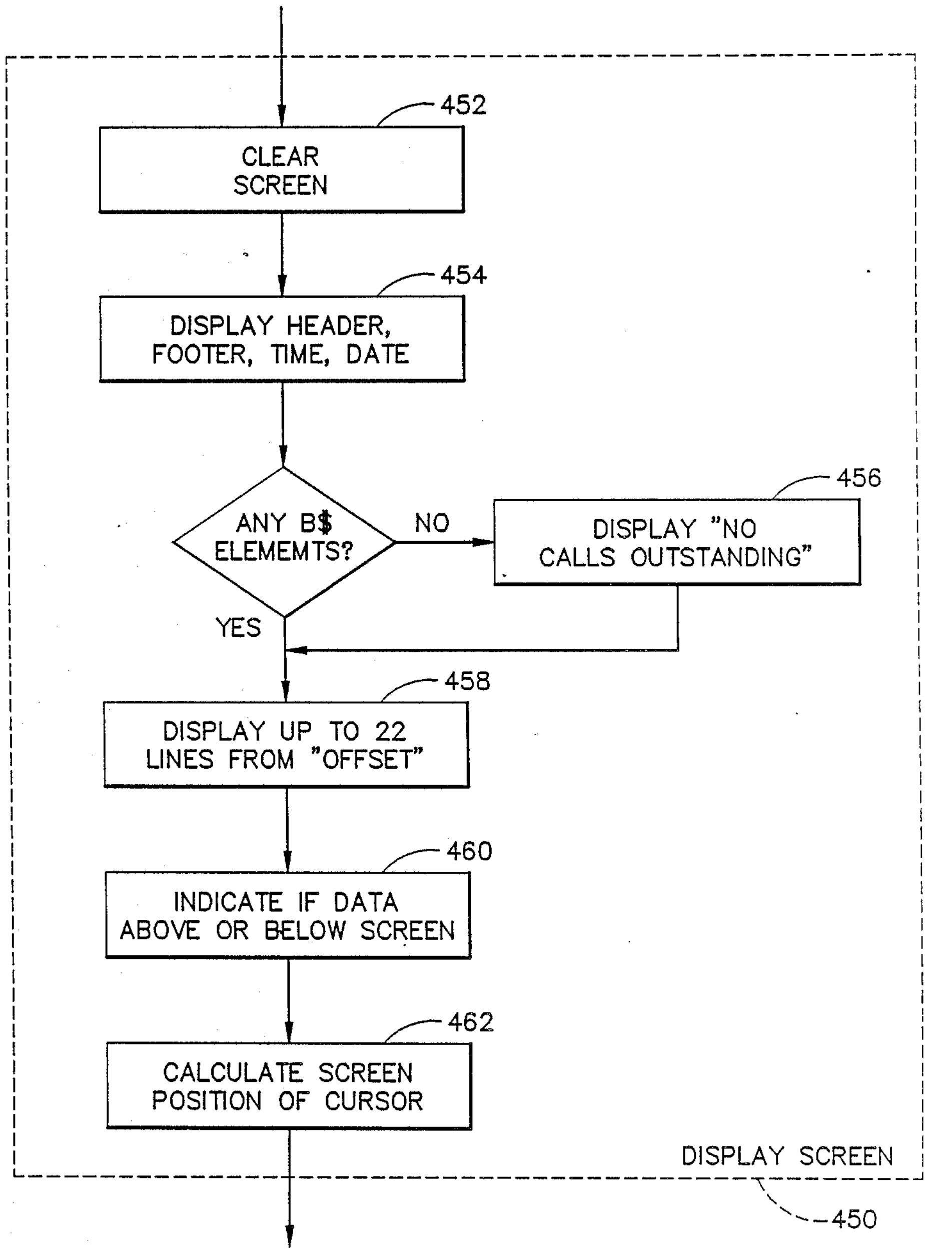
FIG. 11 is a third level program flow chart of the subroutine DRAW SCREEN of the routine PROCESS FUNCTION KEY flow charted in FIG. 10*a*, 10*b* and of other routines.

Various function keys by which the system operator may typically interface with the operating program 3100 (FASTCAB) are shown in the flow chart of routine FUNCTION KEY of block 400 in FIG. 10. The assigned meanings of function keys F1–F8, and F–10 that are available on a personal computer KEYBOARD 3200 may be understood by reference to the flow chart. Most of the functions permit simple housekeeping, logging, and data entry relative to the succession of received messages. The subroutine DRAW SCREEN of block 450, used in the routine PROCESS FUNCTION KEY of block 400, is flow-charted in FIG. 11.

Figure 12:
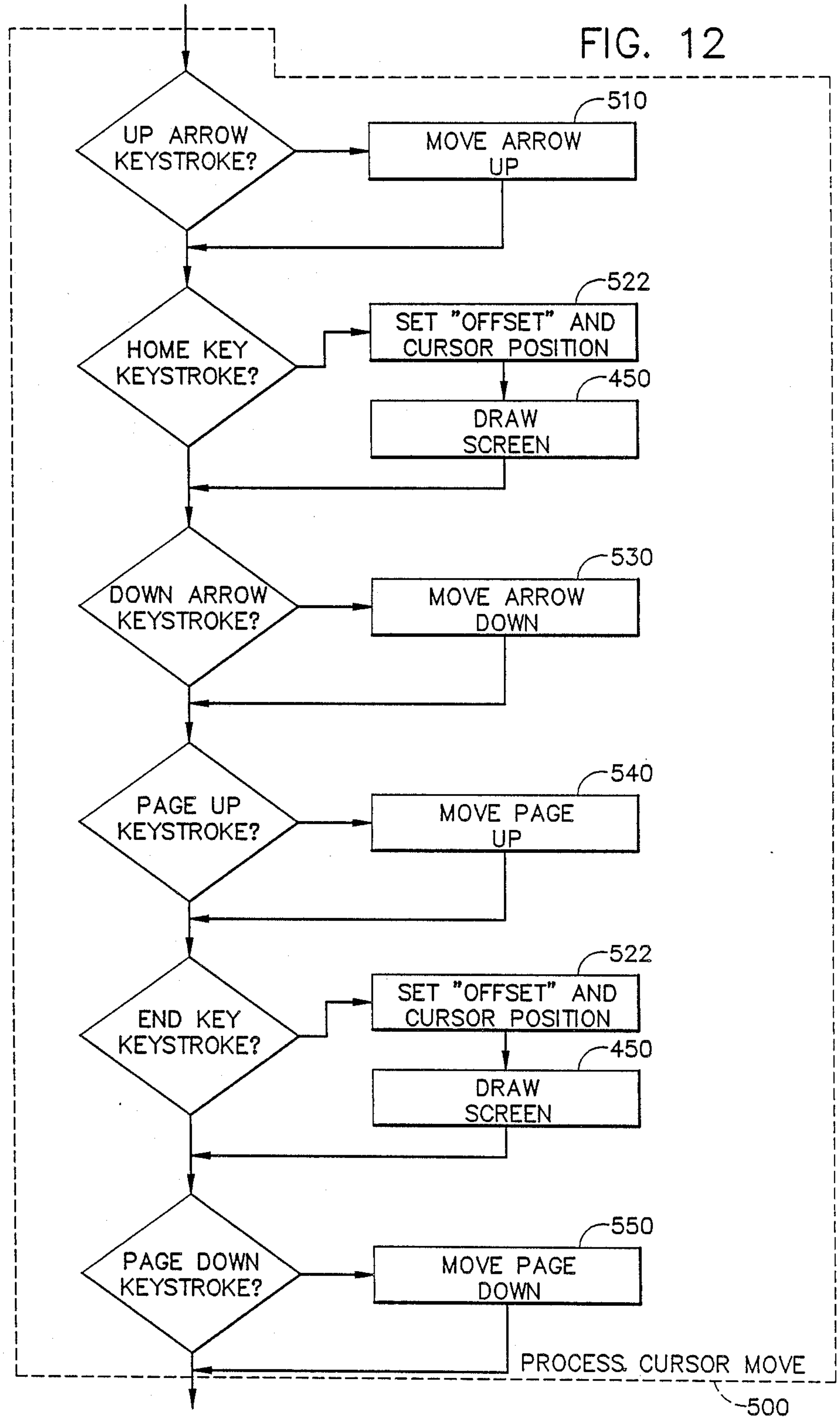
FIG. 12 is a second level program flow chart of the subroutine PROCESS CURSER MOVE of the program FASTCAB flow charted in FIG. 6.
Figure 13:
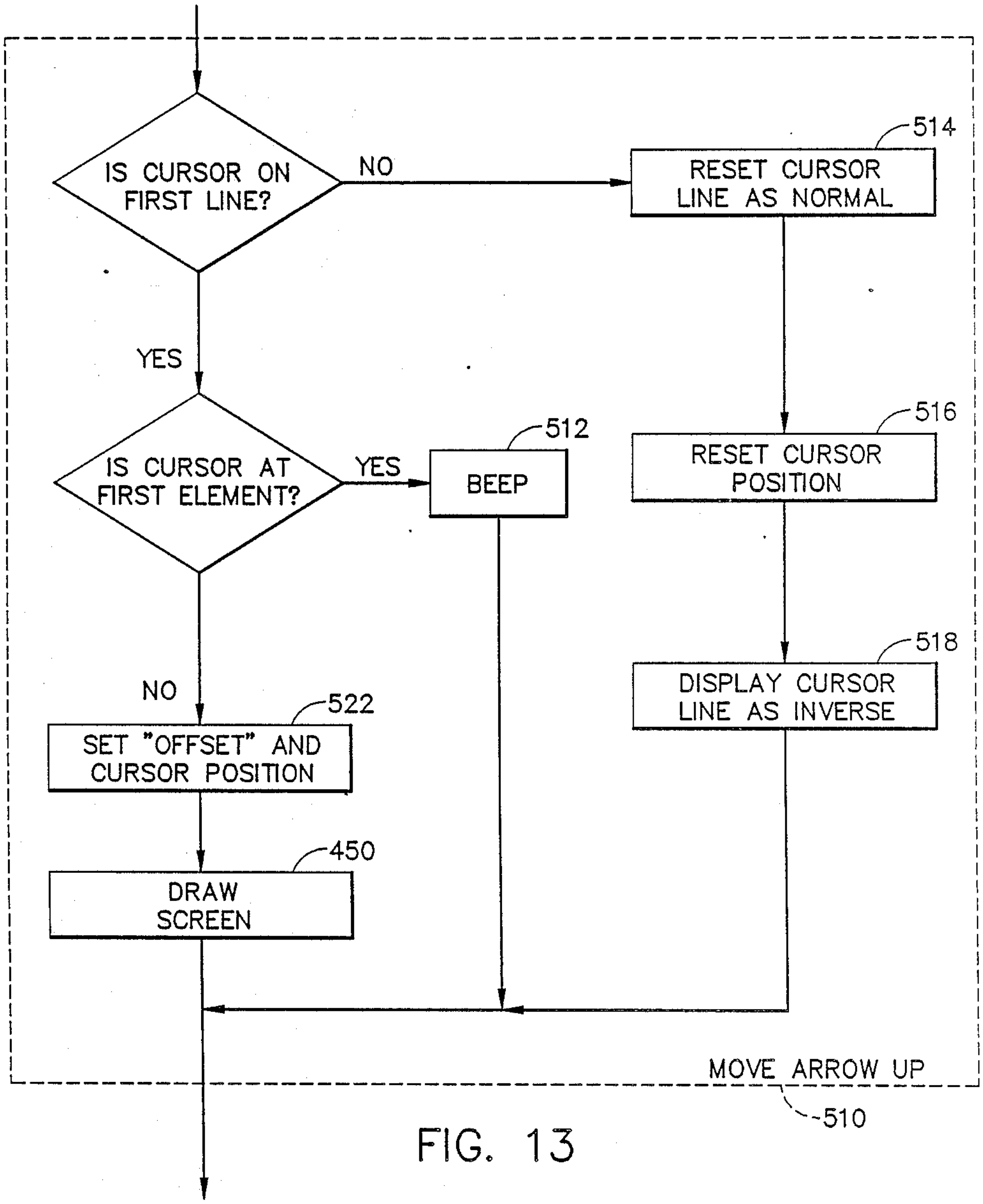
FIG. 13 is a third level program flow chart of the subroutine MOVE ARROW UP of the routine PROCESS CURSER MOVE flow charted in FIG. 12, and of other routines.
Figure 14:
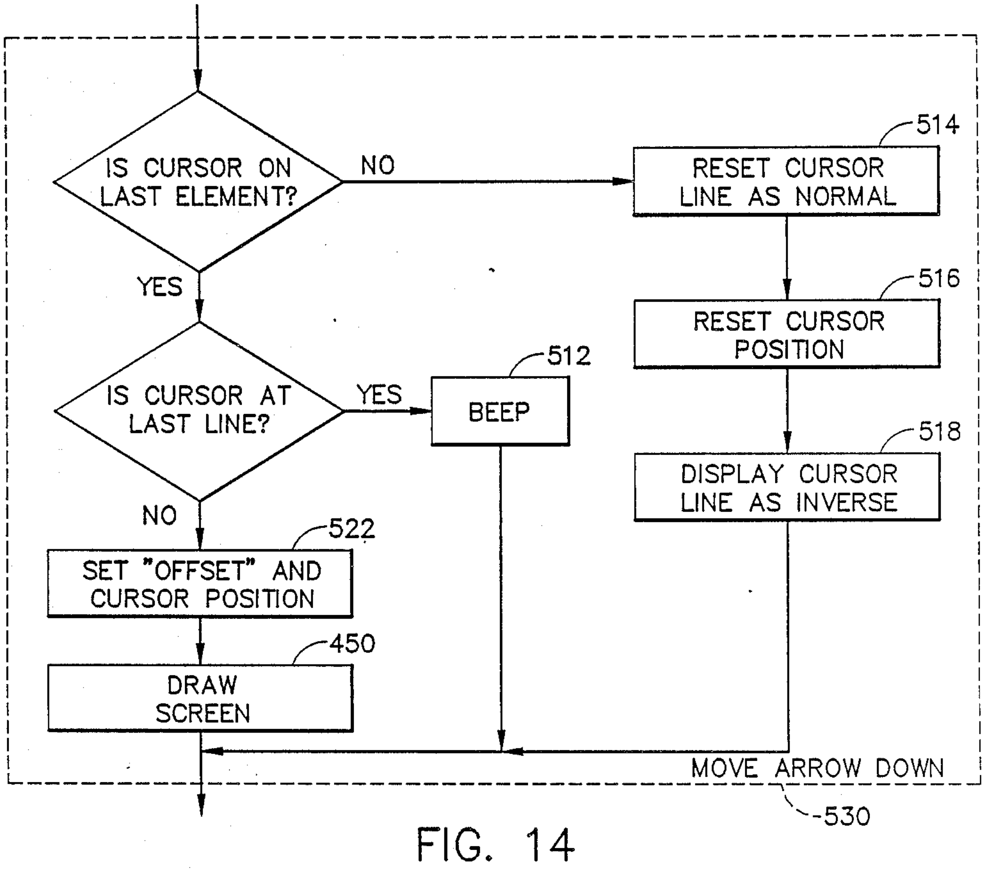
FIG. 14 a third level program flow chart of the subroutine MOVE ARROW DOWN of the routine PROCESS CURSER MOVE flow charted in FIG. 12, and of other routines.
Figure 15:
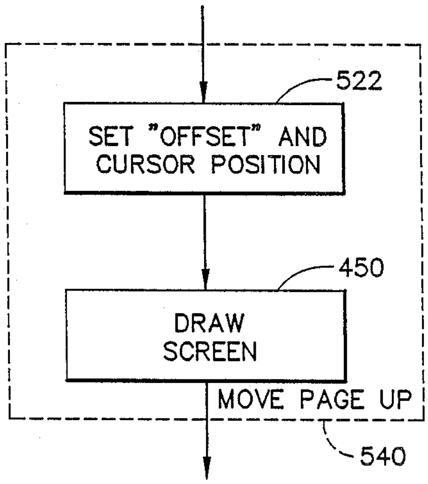
FIG. 15 is a third level program flow chart of the subroutine MOVE PAGE UP of the routine PROCESS CURSER MOVE flow charted in FIG. 12, and of other routines.
Figure 16:
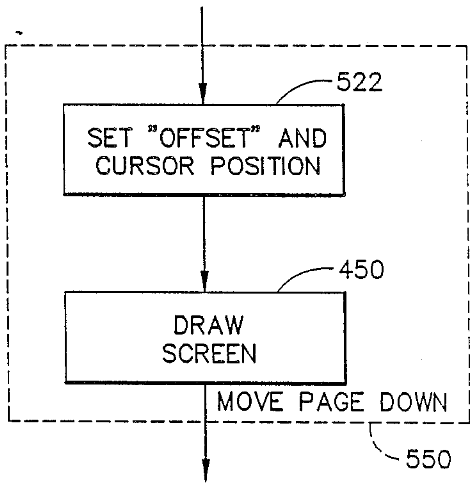
FIG. 16 is a third level program flow chart of the subroutine MOVE PAGE DOWN of the routine PROCESS CURSER MOVE flow charted in FIG. 12, and of other routines.
Figure 17:
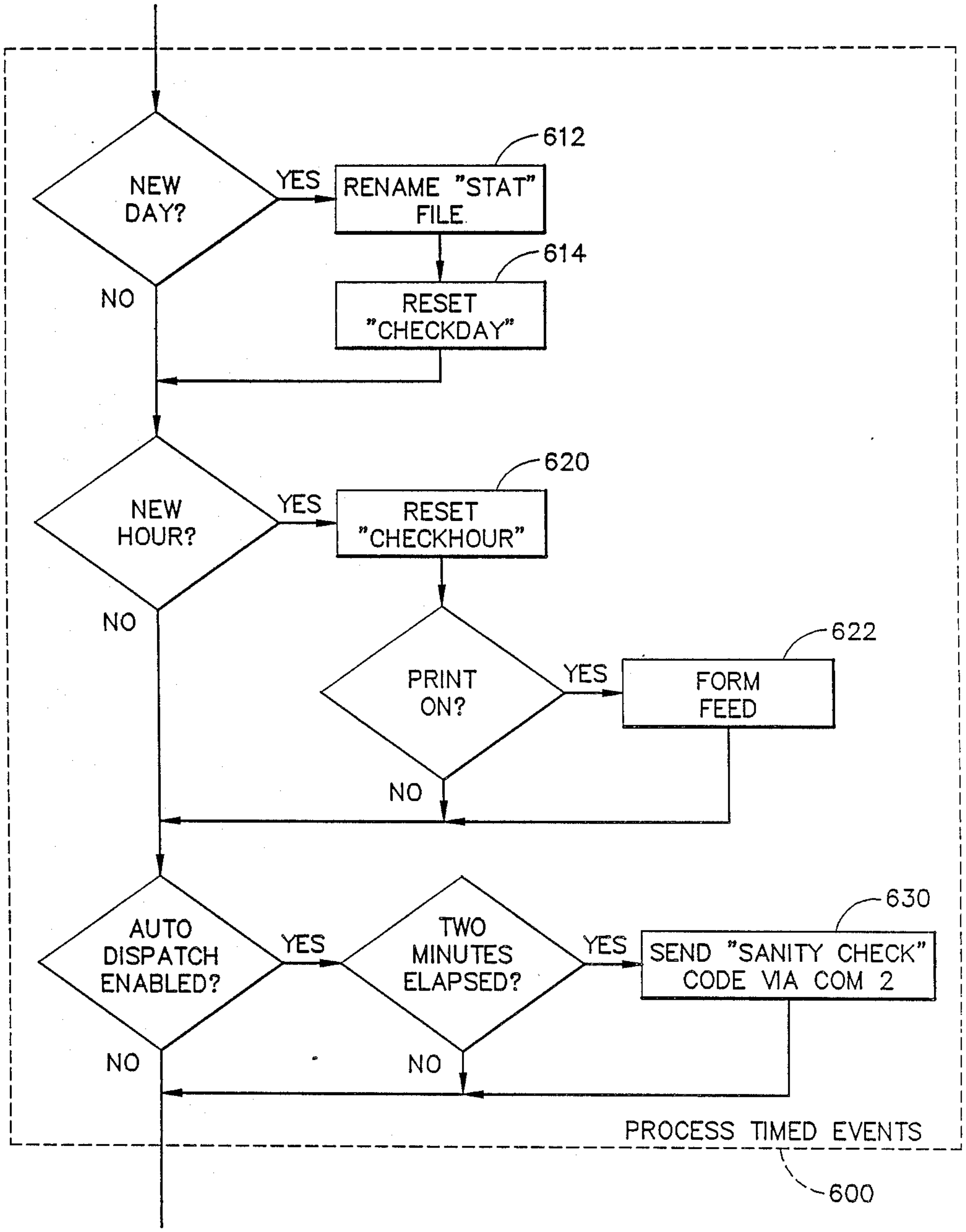
FIG. 17 is a second level program flow chart of the routine PROCESS TIMED EVENTS of the program FASTCAB flow charted in FIG. 6.
Figure 19:
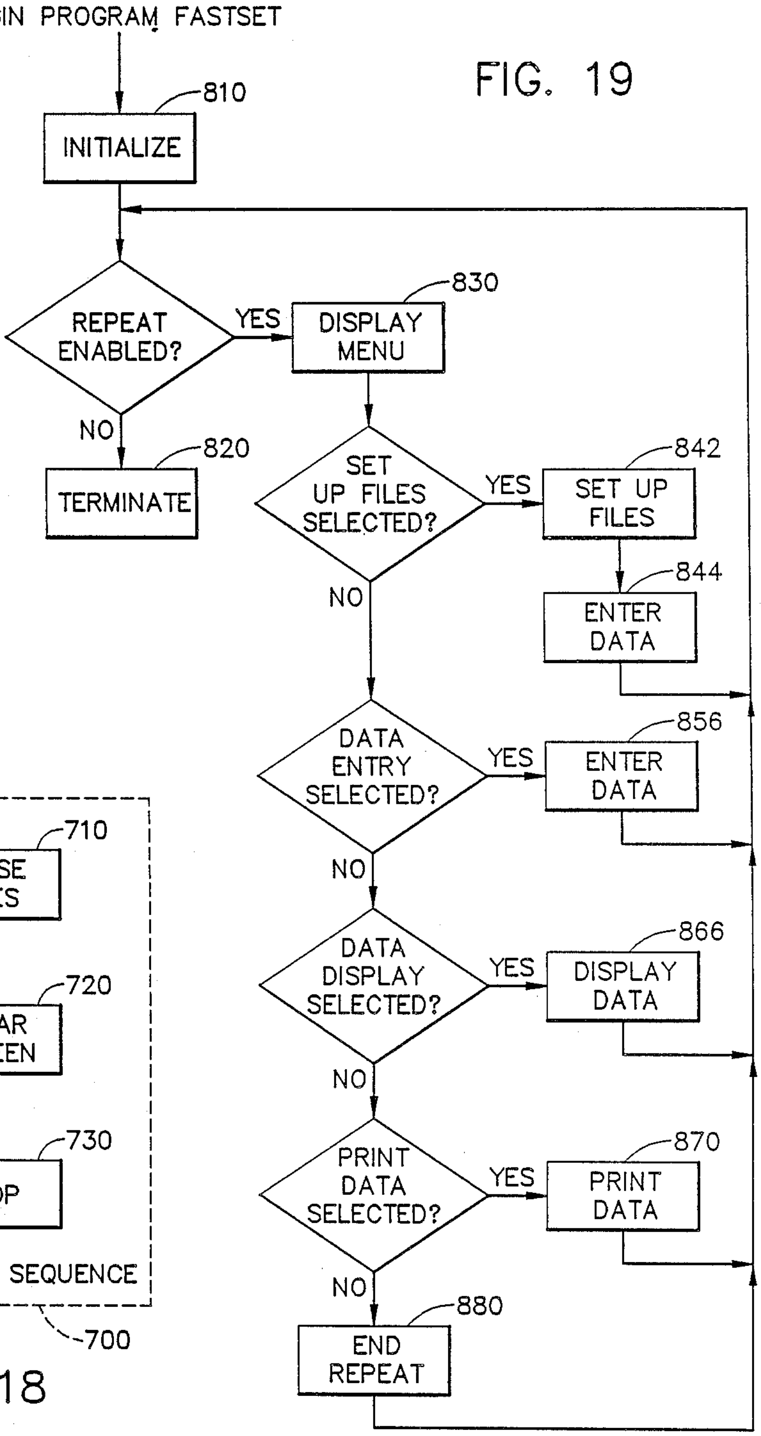
FIG. 19 is a first level program flow chart of the program FASTSET executed by the COMPUTER component of the telemetry system in accordance with the present invention.
Figure 18:
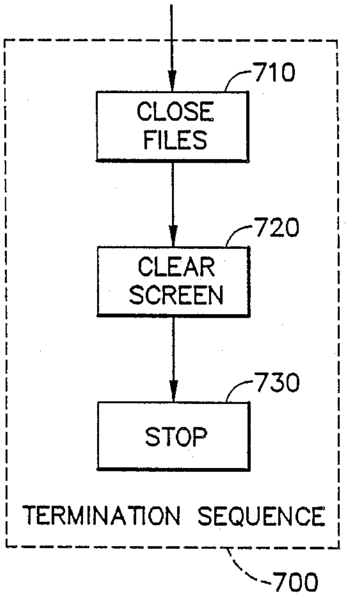
FIG. 18 is a second level program flow chart of the routine TERMINATION SEQUENCE of the program FASTCAB flow charted in FIG. 6.

In a like manner, the major program routine of PROCESS CURSOR MOVE of block 500 is flow-charted in FIG. 12 whereas subroutines MOVE ARROW UP of block 510, MOVE ARROW DOWN of block 530, MOVE PAGE UP of block 540, and MOVE PAGE DOWN of block 550 that are used within this routine are variously flow charted in FIGS. 13–16. Final major FASTCAB program routines PROCESS TIMED EVENTS of blocks 600, and TERMINATION SEQUENCE of blocks 700, are respectively flow charted in FIGS. 17 and 18. A listing of the program FASTCAB that is flow charted within FIGS. 6–18 is attached as Appendix A to this specification disclosure.

It is desired to be able to perform a utility manipulation, for the purposes of data analysis and assessment, of the cumulative message files generated by operation of the program FASTCAB. It is additionally desired to be able to selectively initialize, display, and print such files. This utility manipulation is accomplished by program FASTSET which is flow charted in FIG. 19. The program, which has some routines and subroutines in common with the program FASTCAB, allows ready manipulation of the permanent historical record of system operation. The data so produced is available not only for assessing hardware performance but also for recognizing load factors, periodic patterns of occurrences, and traffic flows which may be pertinent to the temporal and spacial deployment of the transportation resources, mainly the taxicabs. The listing of the program FASTSET is attached as appendix B to this specification disclosure.

In accordance with the preceding discussions, obvious alterations and variations in the present invention will suggest themselves to a practitioner of the art of designing telemetry systems, and computer-based digital data processing systems. The digital message transmission and processing in accordance with the present invention is adaptable to other purposes other than the requesting of transportation services. For example, the digital messages and ensuing processing of such messages may reflect alarms or diverse matters other than transportation. The concept of the present invention that a user should be provided with a positive response feedback to his/her initiation of a message request without bidirectional communication of request and acknowledgement to and from a central station is obviously extendable to many telemetry systems receiving human-initiated messages at remote points, and wherein it is desired economize in the equipments, time, and radio frequency band-width used in the acknowledgement of such messages. Finally, the redundant message transmission in accordance with the present invention suggests alternative schemes for realizing reliable message receipt from a multiplicity of asynchronous originators of messages. Particularly, both time and frequency of multiplexing of message transmissions are more readily accomplished with modern digital technology than was priorly the case. In the case of time multiplexing, a broadcast of a central time coordination and marker signal may allow for the polling of call boxes at successive intervals, a particular interval being allowed for the response of each call box. The alternative use of frequency multiplexing records that the message communication of each asynchronous call box should be separately distinguishable in the electromagnetic spectrum, although this procedure requires extensive bandwidth and considerable sophistication in the receiving equipments, especially if a number of messages must be concurrently received.

In accordance with the preceding remarks, the present invention should be interpreted in accordance with the language of the following claims, only, and not solely in accordance with the particular preferred embodiment within which the invention has been taught.

APPENDIX A

```
30 REM * INITIALIZE ARRAY AND AWAITS CALLS FOR CABS, WITH SCREEN CONTROL   *
40 REM * AND OUTPUT FILES FOR RESTART, STATIS.LOG, AND PRINTER.            *
45 REM * VERSION WITH OUTPUT VIA COM2 TO DEC COMPUTER                      *
50 REM ************************************************************************
   DEF FNconvrt$(NUMBER)
   LOCAL MM$, MM
   MM$ = STR$(NUMBER)
   MM  = LEN(MM$)
   MM$ = RIGHT$(MM$, MM-1)
   FNconvrt$ = RIGHT$("000" + MM$, NUMBER)
   END DEF
60 KEY OFF
70 DIM A$(3,255)
80 CLS
90 RESET
100 PRINT : PRINT SPACE$(22);"FASTCAB - DECEMBER 10, 1987 VERSION"
    LOCATE 4,10
    PRINT "COPYRIGHT (C) 1987.  BAKER & DRAKE, INC."
    LOCATE 5,10
    PRINT "                          2500 PRATER WAY"
    LOCATE 6,10
    PRINT "                          SPARKS, NEVADA 89431"
    LOCATE 22,1
120 OPEN "STATION.CAB" AS #1 LEN=20
130 FIELD #1,20 AS STORE$
140 COLS% = 255 : ROWS% = 3
150 PRINT : PRINT SPACE$(31);"LOADING STATIONS..."
160 FOR X% = 0 TO ROWS% : FOR Y% = 0 TO COLS%
170     P% = 256 * X% + Y% + 1
180     GET #1 , P%
190     A$(X%,Y%) = STORE$
195 NEXT Y% : NEXT X%
196 PRINT : PRINT
197 GOTO 6000 :REM BEGINNING OF MAIN PROGRAM
200 REM ****************** VIEW A STATION ADDRESS **********************
210 CLS
    GOSUB FunctionStop
    IF NOT FLAGTEST THEN COM(1) STOP
220 PRINT "                 VIEW A STATION ADDRESS"
230 INPUT "ENTER PREFIX (0 - 3): "; QX%
240 IF (QX% < 0) OR (QX% > 3) GOTO 280
250 INPUT "ENTER STATION ID (0 - 255): "; QY%
260 IF (QY% < 0) OR (QY% > 255) GOTO 280
270 PRINT "STATION LOCATION IS: "; A$(QX%,QY%) : GOTO 290
280 PRINT "VALUE OUT OF RANGE."
290 INPUT "PRESS ENTER TO CONTINUE. ":ANS$
299 GOSUB 1000:
    GOSUB FunctionGo
    IF NOT FLAGTEST THEN COM(1) ON
    RETURN
1000 REM ****************** FULL SCREEN DRAWING ROUTINE ***************
1010 CLS
     GOSUB FunctionStop
1020 LOCATE 1,1
1030 PRINT MSG$;
1040 LOCATE 25,1
1050 PRINT " F1-PRINT TOGGLE F2-VIEW STATION F3 A:TOGGLE F4-RECEIVER F5-DISPATCH
 F10-EXIT";
1060 REM
1070 LOCATE 1,1
1080 PRINT DATE$;
1090 LOCATE 1,71
1100 PRINT TIME$;
     LOCATE 1,9
     IF PR% THEN PRINT "PRINTER=ON "; ELSE PRINT "PRINTER=OFF";
     LOCATE 1,21
     IF STAT% THEN PRINT "A:=ON "; ELSE PRINT "A:=OFF";
1110 IF N% > 0 GOTO 1150
1120      LOCATE 2,1
1130      PRINT "No Calls Outstanding."
1140      N% = 0
          GOSUB FunctionGo
1145      RETURN
```

```
1150 LOCATE 1,1
1160 M% = OFFSET% + 21
1170 IF M% > K% THEN M% = K%
1180 FOR I% = OFFSET% TO M%
1190      IF I% = N% THEN COLOR 0,7
1200      PRINT I%; "  "; B$(I%)
1210      COLOR 7,0
1220 NEXT I%
1230 LOCATE 1,4 : PRINT K%;
1235 REM ***** INDICATE IF MORE DATA BELOW SCREEN
1240 IF M% = K% GOTO 1270
1250   LOCATE 1,3
1260   PRINT CHR$(25);
1270 REM ***** INDICATE IF MORE DATA ABOVE SCREEN
1280 IF OFFSET% = 1 GOTO 1310
1290   LOCATE 1,1
1300   PRINT CHR$(24);
1310 REM ***** PLACE CURSOR ON SCREEN
1320 L% = N% - OFFSET% + 1
1330 LOCATE L% + 1, 1, 1, 0, 13
     GOSUB FunctionGo
1340 RETURN
3000 REM ************************ CALL RECEIVED. IS IN C$ ****************
     PX% = VAL(MID$(C$,1,2)) : PY% = VAL(MID$(C$,4,3))
     IF NOT FLAGSEND THEN 3010
     IF (MID$(C$,8,1)="C" AND PX% >=0 AND PX%<=3 AND PY%>=0 AND PY%<=255) THEN P
RINT #3, "C "+MID$(C$,1,6)
3010 REM ***** CHECK B$ ARRAY SIZE & ADJUST IF NECESSARY
3020 IF K% < 512 GOTO 3070
3030      FOR I% = 1 TO 511
3040           B$(I%) = B$(I% + 1)
3050      NEXT I%
3052      IF OFFSET% > 1 THEN OFFSET% = OFFSET% - 1
3054      IF N% > 1 THEN N% = N% - 1
3060      K% = 511
3070 K% = K% + 1
3080 F1$ = "  " + MID$(C$,8,1) + "  " + MID$(C$,1,6) + "  "
3095 IF (PX% > -1) AND (PX% < 4) AND (PY% > -1) AND (PY% < 256) THEN F1$ = F1$
+ A$(PX%, PY%)
3100 F2$ = "  " + DATE$ + "  " + TIME$ + SPACE$(10)
3110 B$(K%) = LEFT$(F1$+SPACE$([illegible]),35) + F2$
3120 IF K% > 1 GOTO 3150
3130    N% = 1
3140    OFFSET% = 1
3150    GOSUB 1000
3155 REM AUDIO TONE DEPENDING ON TYPE OF SIGNAL
3160 S$ = MID$(C$,8,1)
3165 IF S$ = "C" THEN GOSUB 3400
3170 IF S$ = "V" THEN
        IF VAL(MID$(C$,1,2))=3 THEN
           B$(K%) = LEFT$(B$(K%),57) + "  POLICE CALL"
           GOSUB 1000
           GOSUB 3600
        ELSE
           GOSUB 3400
        END IF
     END IF
3180 IF S$ = "B" THEN GOSUB 34[illegible]0
3185 IF S$ = "R" THEN GOSUB 3510
3190 REM STORE SCREEN RECOVER ARRAY
3200 OPEN SCRN$ FOR OUTPUT AS #2
3210 FOR I% = 1 TO K%
3220      PRINT #2, B$(I%)
3230 NEXT I%
3240 CLOSE #2
3250 REM ***** SAVE RECORD TO STAT FILE
     IF STAT% THEN
        ON ERROR GOTO 50000
        OPEN STAT$ FOR APPEND AS 2
        PRINT #2, B$(K%)
        CLOSE #2
        ON ERROR GOTO 0
     END IF
```

```
3290 REM ***** SAVE STRING TO PRINT FILE
     IF PR% THEN
        ON ERROR GOTO 50000
        'OPEN PRNT$ FOR APPEND AS 2
        LPRINT B$(K%)
        'CLOSE #2
        ON ERROR GOTO 0
     END IF
3330 RETURN
3400 REM *********** CALL TONE
3410 PRINT CHR$(7);CHR$(7);
3420 RETURN
3430 REM *********** VANDAL TONE
3440 SOUND 392,6: SOUND 440,2: SOUND 506,4: SOUND 392,4: SOUND 32767,8
3450 SOUND 391.6: SOUND 441.2: SOUND 506,4: SOUND 392.4: SOUND 587.33,16
3460 RETURN
3470 REM *********** BATTERY TONE
3480 FOR I% = 1 TO 3: SOUND 392.4: SOUND 523.25,4: SOUND 659.26,2: SOUND 523.25
,2: SOUND 392,2. SOUND 32767,1: NEXT I%
3490 SOUND 391,4: SOUND 523.25,12
3500 RETURN
3510 REM *********** DIAGNOSTIC REPORT TONE
3520 SOUND 392,7: SOUND 32767,1: SOUND 392,5. SOUND 32767,1: SOUND 392,1.5: SOU
ND 32767,.5: SOUND 392,8: SOUND 506,6: SOUND 440,1.5: SOUND 32767,.5: SOUND 440
,4: SOUND 392,3: SOUND 32767,1: SOUND 392,4: SOUND 374,4: SOUND 392,16
3530 RETURN
3600 REM *********** POLICE CALL (VANDAL ON PREFIX 3)
     PLY$ = "GA AB B CD-DE-EFG-GA-AB-B CD-DE EFG-GA-AB-B CD-DD-C BB-AA-GG-FEE-D
D-C DE-AA-GG-FEE-DD-C BB-AA-G"
     PLAY "MLO2L64X"+VARPTR$(PLY$)+"X"+VARPTR$(PLY$)+"X"+VARPTR$(PLY$)
     RETURN
4000 REM ********************* CAB DISPATCH SUBROUTINE ******************
4010 IF K% = 0 THEN RETURN
4012 B$(N%) = LEFT$(B$(N%),59) + TIME$
     IF PR% THEN
       ON ERROR GOTO 50000
       'OPEN PRNT$ FOR APPEND AS 2
       LPRINT B$(N%)
       'CLOSE #2
       ON ERROR GOTO 0
     END IF
4015 REM ***** SAVE IN CASE OF RECOVERY
4016 RECOV$ = B$(N%)
4020 IF N% = K% THEN 4090
4030    FOR I% = N% TO K% - 1
4040          B$(I%) = B$(I% + 1)
4050    NEXT I%
4060    K% = K% - 1
4070    GOSUB 1000
4080    RETURN
4090 REM N% = K% (SITTING ON LAST ENTRY)
4100 K% = K% - 1
4110 N% = K%
4120 IF K% = 0 GOTO 4140
4130 IF OFFSET% > K% THEN OFFSET% = OFFSET% - 1
4140 GOSUB 1000
4150 RETURN
5000 REM ************************ PRINTER TOGGLE ROUTINE ***************
     PR% = -1 - PR%
     PMSG$ = MSG$(0)
     GOSUB 1000
     RETURN
5100 REM ************************* STAT FILE TOGGLE ROUTINE *************
     STAT% = -1 - STAT%
     PMSG$ = MSG$(0)
     GOSUB 1000
     RETURN
6000 REM **************** RECOVERY ROUTINE ***************************
6010 REM ***** IS THERE SOMETHING LEFT TO RECOVER?
6020 IF LEN(RECOV$) = 0 GOTO 6300
     IF PRNT% THEN
        ON ERROR GOTO 50000
6030      'OPEN PRNT$ FOR APPEND AS 2
```

```
6040      LPRINT RECOV$; " RECO.ERLI"
6050        CLOSE #2
          ON ERROR GOTO 0
     END IF
6060 IF N% = 512 GOTO 6600
6070 N% = N% + 1
6080 FOR I% = N% TO N% + 1 STEP -1
6090      B$(I%) = B$(I% - 1)
6100 NEXT I%
6110 B$(N%) = RECOV$
6120 RECOV$ = ""
6130 GOSUB 1000
6140 RETURN
6500 REM ***** LEN(RECOV$) = 0
6510 PRINT CHR$(7);
6520 RETURN
6600 REM ***** N% = 512, SO DELETE FIRST ENTRY
6610 FOR I% = 1 TO N% - 1
6620      B$(I%) = B$(I% + 1)
6630 NEXT I%
6640 B$(N%) = RECOV$
6650 RECOV$ = ""
6660 GOSUB 1000
6670 RETURN
7000 REM ********************** CHANGE A STATION LOCATION **************
7001 CLS
     GOSUB FunctionStop
     IF NOT FLAGTEST THEN COM(1) STOP
     IF NOT FLAGPSW THEN 7020
     PRINT "ENTER PASSWORD FOR CHANGING STATION LOCATION: ";
     COLOR 0,0 : INPUT " ";PSW$ : COLOR 7,0
     IF PSW$ <> "PASSWORD" THEN
          PRINT CHR$(7);
          IF NOT FLAGTEST THEN COM(1) ON
          GOSUB 1000
          GOSUB FunctionGo
          RETURN
     END IF
     CLS
7020 PRINT SPACE$(34);"CHANGE A STATION ADDRESS"
7030 INPUT "ENTER PREFIX (0 - 3), 99 TO TOGGLE PASSWORD, OR OTHER VALUE TO EXIT
: ";QX%
     IF QX% = 99 THEN
          FLAGPSW = -1 - FLAGPSW
          IF NOT FLAGTEST THEN COM(1) ON
          GOSUB 1000
          GOSUB FunctionGo
          RETURN
     END IF
7040 IF (QX% < 0) OR (QX% > 3) GOTO 7160
7050 INPUT "ENTER STATION I.D. (0 - 255), OR OTHER VALUE TO EXIT: ";QY%
7060 IF (QY% < 0) OR (QY% > 255) GOTO 7160
7070 PRINT "CURRENT STATION LOCATION IS: "; A$(QX%,QY%)
7080 INPUT "ENTER STATION LOCATION (1 - 20 CHARACTERS): ";ANS$
7090 A$(QX%,QY%) = LEFT$(ANS$ + SPACE$(20),20)
7100 OPEN "STATION.DAT" AS #2 LEN=20
7110 FIELD #2,20 AS STORE$
7120 LSET STORE$ = A$(QX%,QY%)
7130 P% = 256 * QX% + QY% + 1
7140 PUT #2, P%
7150 CLOSE #2
7160 GOSUB 1000
     GOSUB FunctionGo
7170 IF NOT FLAGTEST THEN COM(1) ON
     RETURN
8000 REM ******************** MAIN PROGRAM ****************************
8010 GOSUB 1000 : REM INITIALIZATION
     ON KEY(1) GOSUB 5000
     ON KEY(2) GOSUB 200
     ON KEY(3) GOSUB 5100
     ON KEY(4) GOSUB 6000
     ON KEY(6) GOSUB 7000
     ON KEY(8) GOSUB 4000
```

```
    ON KEY(10) GOSUB 40000
    GOSUB FunctionGo
    IF NOT FLAGTEST THEN
        OPEN "COM1:1200,N,8,1,CS,DS,CD" AS #1
    END IF
8020 REM ***** BEGIN MAIN LOOP
8022 LOCATE 1,56
8023 PRINT DATE$;
8024 LOCATE 1, 70
8025 PRINT TIME$;
    ON ERROR GOTO 50000
    IF LOC(1) < 8 THEN 8130
    GOSUB FunctionStop
    LINE INPUT #1, C$
    GOSUB 3000
    LOCATE 24,5: PRINT "LAST TRANSMISSION: ";C$;
    LOCATE L% + 1,1,1,0,13
    GOSUB FunctionGo
    ON ERROR GOTO 0
8130 A$ = ""
8140 A$ = INKEY$
8150 IF A$ = "" THEN 9000        : REM NO KEYSTROKE, CHECK CLOCK
8160 REM ***** PROCESS KEYSTROKE
8165 IF LEN(A$) = 1 GOTO 9500    :REM NON-CURSOR-MOVE-KEYSTROKE
8170 A% = ASC(MID$(A$,2,1))
    IF A% = 72 THEN GOSUB 8190  :' CURSOR UP
    IF A% = 80 THEN GOSUB 8390  :' CURSOR DOWN
    IF A% = 71 THEN GOSUB 8600  :  HOME
    IF A% = 79 THEN GOSUB 8650  :' END
    IF A% = [illegible] THEN GOSUB 8[illegible]  :  PAGE UP
    IF A% = 81 THEN GOSUB 8[illegible]  :  PAGE DOWN
    GOTO 8020

    REM CURSOR UP
8190    IF L% [illegible] 1 GOTO 82[illegible]      : REM TOP SCREEN CHECK
8200       IF OFFSET% = 1 THEN 8250    : REM TOP OF DATA CHECK
8210          OFFSET% = OFFSET% - 1
8220          N% = N% - 1
8230          GOSUB 1000
8240          RETURN
8250 REM ***** L% = 1 AND OFFSET% = 1, BEEP & GO.
8260     PRINT CHR$(7);
8270     RETURN
8280 REM ***** MOVE CURSOR UP A LINE
8290     LOCATE L% + 1, 1
8300     PRINT N%; "  "; B$(N%)      : REM REPRINT CURSOR LINE NORMAL
8310     N% = N% - 1
8320     L% = L% - 1
8330     LOCATE L% + 1, 1
8340     COLOR 0, 7
8350     PRINT N%; "  "; B$(N%)
8360     COLOR 7, 0
8370     LOCATE L% + 1, 1, 1, 0, 13
8375     RETURN

     REM CURSOR DOWN
8390    IF N% = K% GOTO 8570       : REM LAST ENTRY CHECK
8400       IF L% = 22 GOTO 8520    : REM LAST SCREEN LINE CHECK
8410          REM ***** MOVE CURSOR DOWN A LINE
8420          LOCATE L% + 1, 1
8430          PRINT N%; "  "; B$(N%)
8440          N% = N% + 1
8450          L% = L% + 1
8460          LOCATE L% + 1, 1
8470          COLOR 0,7
8480          PRINT N%; "  ";B$(N%)
8490          COLOR 7,0
8500          LOCATE L% + 1, 1, 1, 0, 13
8510          RETURN
8520 REM ***** SCROLL SCREEN UP ONE LINE
8530     N% = N% + 1
8540     OFFSET% = OFFSET% + 1
8550     GOSUB 1000
```

```
3560      RETURN
3570 REM ***** CURSOR IS ON LAST ENTRY
3580      PRINT CHR$(7);
3585      RETURN

         REM HOME KEYPRESS
3600     OFFSET% = 1
3610     N% = 1
3620     GOSUB 1000
3630     RETURN
         REM END KEYPRESS
3650     OFFSET% = N% - 21
3660     IF OFFSET% < 1 THEN OFFSET% = 1
3670     N% = OFFSET%
3680     GOSUB 1000
[illegible]     RETURN

         REM PAGE UP
8710     IF OFFSET% = 1 GOTO 8770
8720        OFFSET% = OFFSET% - 22
8730        IF OFFSET% < 1 THEN OFFSET% = 1
8740        N% = OFFSET%
8750        GOSUB 1000
8760        RETURN
8770 REM ***** FIRST PAGE
8780      PRINT CHR$(7);
8790      RETURN

         REM PAGE DOWN
8810     IF OFFSET% > N% - 22 GOTO 8650  : REM EQUIV TO END CURSOR MOVE
8820     OFFSET% = OFFSET% + 22
8830     N% = OFFSET%
8840     GOSUB 1000
8850     RETURN
8890 REM CONTINUATION OF PARSING SPECIAL KEYSTROKES GOES HERE
8900 PRINT CHR$(7 ;
8910 RETURN
9000 REM ****************** CLOCK CHECK FOR TIMED TASKS *****************
9010 D$ = MID$(DATE$,4,2)
9020 IF D$ = DAYCHK$ GOTO 9070
9030     REM ***** NEW DAY, NEW STAT FILE
9040     D$ = DATE$
9050     IF FLAGTEST THEN
            STAT$ = "A:\STAT.CAB"    : REM FOR TESTING PURPOSES
          ELSE
            STAT$ = "A:\STAT" + MID$(D$,1,2) + MID$(D$,4,2) + ".CAB"
         END IF
9060     DAYCHK$ = MID$(D$,4,2)
9070     IF (FLAGTEST AND (NT < TIME$)) THEN GOSUB NewCall
         H% = VAL(MID$(TIME$,1,2))
         IF FLAGSEND THEN
             TICK% = VAL(MID$(TIME$,4,2))
             IF TICK% = 2 * INT(TICK% / 2) GOTO 9079
             IF TOCK% = 0 GOTO 9080
             TOCK% = 0
             PRINT #3, "Z 99 999"
             GOTO 9080
9079         TOCK% = 1
9080         REM
         END IF
         IF H% = HR% GOTO 8020
         HR% = H%
         IF FR% THEN
             [illegible]
             [illegible]
             IF [illegible] THEN
                 PRNT$ = "PRINT1.CAB"
               [illegible]
                 [illegible] "PRINT[illegible].CAB"
             END IF
             ON ERROR GOTO [illegible]
              OPEN PRNT$ FOR OUTPUT AS #2
              CLOSE #2
```

```
        ON ERROR GOTO 0
        H1% = 1 - H1%
      END IF
      GOSUB 1000
      GOTO 8020
9500 REM ***************** RETRIEVE PROCESSING
9510 REM ***** PATCH ADDED TO TEST CALLS
9520 REM ***** BUILD A C$ VARIABLE
     IF NOT FLAGTEST THEN 8120
9530 LOCATE 24,1
9540 INPUT "ENTER CODE: ",C$: GOSUB 3000: RETURN
10000 REM ************************** INITIALIZATION ***************************
10020 RECOV$ = ""
10030 DIM B$(310), MSG$(7
      MSG$(0) = "(C) 1987 Baker & ...
      MSG$(1) = "Printer not ready
      MSG$(2) = "Printer paper indicator"
      MSG$(3) = "A: Disk full
      MSG$(4) = "A: Write protected        "
      MSG$(5) = "A: Floppy media error     "
      MSG$(6) = "A: Disk drive not ready"
      MSG$(7) = "Print file simult. use"
      PMSG$ = MSG$(0)
      CHOLD$ = ""
10040 WORD = 8
10060 SCRN$ = "SCRSAV.CAB"
      REM SET DEFAULTS
      PR% = 0
      STAT% = 0
      FLAGPSW = -1
      CLS
      LOCATE 8,29
      PRINT "PROGRAM INITIALIZATION"
      LOCATE 10,20
  THIS CODE IS FOR TESTING WITH RANDOMLY GENERATED INPUT
       INPUT "ACCEPT INPUT VIA COM1: (Y/N) ";YN$
       YN$ = YN$ + " "
       IF (LEFT$(YN$,1) = "Y" OR LEFT$(YN$,1) = "y") THEN
          FLAGTEST = 0
         ELSE
           FLAGTEST = -1
           RANDOMIZE TIMER
          GOSUB NextCall
       END IF
       LOCATE 12,20
      INPUT "SEND ... COMPUTER ... ";YN$
      YN$ = YN$ + " "
      IF (LEFT$(YN$,1) = ... LEFT$(YN$,1) = "y") THEN
         FLAGSEND = -1
       ELSE
         FLAGSEND = 0
      END IF
10070 GOSUB 12000          : REM FILE NAME SET-UP
10090 RESET
10100 REM RECOVER SCREEN SAVE FILE, IF AVAILABLE
10110 K% = 1
10120 OPEN SCRN$ FOR APPEND AS 2
10130 CLOSE #2
10140 CLS
10150 OPEN SCRN$ FOR INPUT AS 2
10160 IF EOF(2) GOTO 10200
10170 LINE INPUT #2, B$(K%)
10180 K% = K% + 1
10190 GOTO 10160
10200 CLOSE #2
10210 K% = K% - 1
10220 REM ***** INITIALLY N% & ... OFFSET ARE SPECIFIED
10230 N% = K%
10240 OFFSET% = K% - 21
10250 IF OFFSET% ... THEN OFFSET% ...
10260 REM DRAW SCREEN
10270 GOSUB 1000
```

```
      IF FLAGSEND THEN
          OPEN "COM2:9600,N,8,1,RS,[illegible]
      END IF
      TICK% = 0 : TOCK% = 0
0290 REM ***** CONTINUE WITH FILE SET UPS
1000 RETURN
2000 D$ = DATE$
      IF NOT FLAGTEST THEN
          STAT$ = "A:\STAT" + MID$(D$,1,2) + MID$(D$,4,2) + ".CAB"
        ELSE
          STAT$ = "A:\STAT.CAB" : REM FOR TESTING PURPOSES
      END IF
2020 DAYCHK$ = MID$(D$,4,2)
2030 T$ = TIME$
2040 H% = VAL(MID$(T$,1,2))
2050 H1% = 1
2060 IF H% = 2 * INT(H% /2) THEN H1% = 0       : REM EVEN HOUR
2070 HR% = H%
2080 PRNT$ = "PRINT0.CAB"
2090 IF H1% = 1 THEN PRNT$ = "PRINT1.CAB"
2100 RETURN
0000 REM ********************** EXIT PROGRAM **********************
0010 RESET
0030 CLOSE
0035 CLS
0040 END
[illegible] REM ******** [illegible] ********
[illegible] IF ERR = [illegible] THEN RESUME [illegible]
      IF (ERR = 24 OR ERR = 25) THEN RESUME [illegible]
      IF ERR = 27 THEN RESUME [illegible]
      IF (ERR = 61 OR ERR = 67) THEN RESUME 50070
      IF ERR = [illegible] THEN RESUME [illegible]
      IF ERR = [illegible] THEN RESUME 50090
      IF ERR = 72 THEN RESUME 50100
      IF ERR = 53 THEN RESUME 50110
[illegible]020 CLOSE #1
      OPEN "COM1:1200,N,8,1,CS,DS,[illegible]" AS #1
      IF K% < 512 THEN
          K% = K% + 1
       ELSE
          FOR I% = 1 TO 511
              B$(I%) = B$(I% + 1)
          NEXT I%
      END IF
      B$(K%) = "COMMUNICATIONS PROBLEM         " + TIME$
      GOSUB 1000
      LOCATE 24,5:PRINT "LAST TRANSMISSION: [illegible]
      LOCATE L% + 1,1,1,[illegible],13
      GOTO 8020
0050 PMSG$ = MSG$(1)
[illegible]055 PR% = 0
      GOSUB 1000
      GOTO 8010
0060 PMSG$ = MSG$(2)
      GOTO 50055
0070 PMSG$ = MSG$(3)
0075 STAT% = 0
      GOSUB 1000
      GOTO 0290
0080 PMSG$ = MSG$(4)
      GOTO 50075
0090 PMSG$ = MSG$(6)
      GOTO 50075
0100 PMSG$ = MSG$(5)
      GOTO 50075
0110 PMSG$ = MSG$(7)
      CLOSE #2
      GOTO 50055
0200 END

 *****************     SUBROUTINE No. 1Call      *********
```

```
extCall:
      TN$ = TIME$
      TN1 = VAL(MID$(TN$,1,2))
      TN2 = VAL(MID$(TN$,4,2))
      TN3 = VAL(MID$(TN$,7,2))
      TN3 = TN3 + 10 + INT(30 * RND)
      IF TN3 > 59 THEN
           TN3 = TN3 - 60
           TN2 = TN2 + 1
           IF TN2 > 59 THEN
                TN2 = TN2 - 60
                TN1 = TN1 + 1
                IF TN1 > 23 THEN TN1 = 0
           END IF
      END IF
      NUMBR = 2
      TN1$ = FNConvrt$(TN1)
      TN2$ = FNConvrt$(TN2)
      TN3$ = FNConvrt$(TN3)
      TN$ = TN1$ + ":" + TN2$ + ":" + TN3$
      RETURN
      REM ************ NewCall ROUTINE ********
NewCall:
      IF (TN$ > "00:00:00" AND TIME$ < "22.00:00") THEN RETURN
      C1 = INT(4 * RND)
      NUMBR = 2
      C1$ = FNConvrt$(C1)
      C2 = INT(10 * RND)
      NUMBR = 3
      C2$ = FNConvrt$(C2)
      C3 = INT(100 * RND)
      SELECT CASE C3
           CASE < 75
                C3$ = " C"
           CASE 75 TO 84
                C3$ = " R"
           CASE 85 TO 92
                C3$ = " B"
           CASE ELSE
                C3$ = " V"
      END SELECT
      C$ = C1$ + " " + C2$ + C3$
      GOSUB NextCall
      GOSUB 3000
      RETURN

 *********************** FUNCTION STOP SUBROUTINE **********

FunctionStop:
      KEY(1) OFF
      KEY(2) OFF
      KEY(3) OFF
      KEY(4) OFF
      KEY(6) OFF
      KEY(8) OFF
      KEY(10) OFF
      RETURN

 *********************** FUNCTION GO SUBROUTINE ***************
FunctionGo:
      KEY(1) ON
      KEY(2) ON
      KEY(3) ON
      KEY(4) ON
      KEY(6) ON
      KEY(8) ON
      KEY(10) ON
      RETURN

END
```

APPENDIX B

```
'*************************************************************************************
'*                              PROGRAM FASTSET                                      *
'* THIS PROGRAM PERFORMS INITIAL SETTING UP OF STATION LOCATION FILE,                *
'* ALLOWS ADDING AND CHANGING STATIONS, ALLOWS VIEWING INDIVIDUAL STATIONS,          *
'* AND PERMITS PRINTING ALL STATION LOCATIONS.                                       *
'*************************************************************************************
CLS
LOCATE 5,36
PRINT "FASTSET"
LOCATE 10,10
PRINT "COPYRIGHT (C) 1987   BAKER AND DRAKE, INC."
LOCATE 11,31
PRINT "2500 PRATER WAY"
LOCATE 12,31
PRINT "SPARKS, NV 89431"
LOCATE 20,1
PRINT "PRESS ANY KEY TO CONTINUE."
100 A$ = INKEY$ : IF LEN(A$) = 0 GOTO 100
CLS
DIM A$(3,255)
RESET
OPEN "STATION.CAB" AS #1 LEN=20
FIELD #1,20 AS STORE$
ON ERROR GOTO 0
500 CLS
'                    MENU LISTING
LOCATE 5,36 : PRINT "FASTSET"
LOCATE 8,20 : PRINT "1 - SET UP STATION LIST FOR THE FIRST TIME"
LOCATE 10,20: PRINT "2 - ENTER OR CHANGE STATION LOCATION"
LOCATE 12,20: PRINT "3 - CHECK INDIVIDUAL STATION LOCATION"
LOCATE 14,20: PRINT "4 - DISPLAY STATION LOCATIONS ON SCREEN"
LOCATE 16,20: PRINT "5 - PRINT LIST OF ALL STATION LOCATIONS"
LOCATE 18,20: PRINT "6 - EXIT PROGRAM"
LOCATE 20,5 : INPUT "ENTER YOUR SELECTION (1 - 6): ";T%
ON T% GOSUB Setup, Entry, Checkup, Display, Printout, Switchout
GOTO 500
'**************************** SET-UP OF DISK FILE ************************
Setup:
        CLS
        PRINT "ALL STATION LOCATIONS WILL BE ERASED!"
        INPUT "DO YOU WISH TO CONTINUE ? (Y/N): "; ANS$
        IF (ANS$ = "Y") OR (ANS$ = "y") GOTO Setup2
        RETURN
Setup2:
        LOCATE 12,30: PRINT "CREATING DISK FILE."
        FOR I% = 1 TO 1024
                LSET STORE$ = SPACE$(20)
                PUT #1, I%
        NEXT I%
        BEEP
        GOTO Entry
'**************************** ENTER OR CHANGE STATION LOCATIONS **********
Entry:
        CLS
        G% = 1
Entry2:
        LOCATE 1,1 :PRINT "ENTER PREFIX (0 - 3) OR OTHER VALUE TO QUIT."
        LOCATE G%+1,1: INPUT X% : IF (X% < 0) OR (X% > 3) THEN RETURN
        LOCATE 1,1 :PRINT "ENTER STATION NUMBER (0 - 255).             "
        LOCATE G%+1,7: INPUT Y%
        IF (Y% < 0) OR (Y% > 255) GOTO Invalid
        LOCATE 1,1 :PRINT "ENTER STATION LOCATION (1 - 20 CHARACTERS). "
        LOCATE G%+1,16 : INPUT "";STATION$
        STATION$ = LEFT$(STATION$ + SPACE$(20), 20)
        LSET STORE$ = STATION$
        P% = 256 * X% + Y% + 1
        PUT #1, P%
Advance:
        G% = G% + 1
        IF G% = 22 GOTO Entry
```

```
        GOTO Entry2
Invalid:
        LOCATE G%+1,16: PRINT "INVALID ENTRY. TRY AGAIN."
        GOTO Advance
'**************************** CHECK UP ON INDIVIDUAL STATION **************
Checkup:
        CLS
        G% = 1
Checkup2:
        LOCATE 1,1 :PRINT "ENTER PREFIX (0 - 3) OR OTHER VALUE TO QUIT."
        LOCATE G%+1,1: INPUT X% : IF (X% < 0) OR (X% > 3) THEN RETURN
        LOCATE 1,1 :PRINT "ENTER STATION NUMBER (0 - 255).          "
        LOCATE G%+1,7: INPUT Y%
        IF (Y% < 0) OR (Y% > 255) GOTO Checkup4
        P% = 256 * X% + Y% + 1
        GET #1, P%
        LOCATE G%+1,16: PRINT STORE$
Checkup3:
        G% = G% + 1
        IF G% = 22 GOTO Checkup
        GOTO Checkup2
Checkup4:
        LOCATE G%+1,16: PRINT "INVALID ENTRY. TRY AGAIN."
        GOTO Checkup3
'************************* DISPLAY LIST OF STATIONS TO SCREEN *************
Display:
        CLS
        G% = 1
        LOCATE G%,1
        FOR X% = 0 TO 3 : FOR Y% = 0 TO 255 : P% = 256 * X% + Y% + 1
                GET #1, P%
                IF STORE$ = SPACE$(20) GOTO Looper
                PRINT X%, Y%, STORE$
                G% = G% + 1 : LOCATE G%,1
                IF G% < 24 GOTO Looper
                PRINT "PRESS A KEY TO CONTINUE.";
Waitawhile:
                A$ = INKEY$ : IF LEN(A$) = 0 GOTO Waitawhile
                CLS
                G% = 1 : LOCATE G%,1
Looper:
        NEXT Y% : NEXT X%
        PRINT "PRESS A KEY TO CONTINUE.";
Waitloop2:
        A$ = INKEY$ : IF LEN(A$) = 0 GOTO Waitloop2
        RETURN
'************************ PRINTOUT LIST OF STATIONS ************************
Printout:
        FOR X% = 0 TO 3 : FOR Y% = 0 TO 255 : P% = 256 * X% + Y% + 1
                GET #1, P%
                IF STORE$ = SPACE$(20) GOTO Looper2
                LPRINT X%, Y%, STORE$
Looper2:
        NEXT Y% : NEXT X%
        RETURN
'************************ EXIT PROGRAM *************************************
Switchout:
        CLS
        CLOSE #1
        END
'************************ END OF PROGRAM ***********************************
```

What is claimed is:

1. A telemetry system for remote registration of requests for services to a central dispatch of such services, the system comprising:

a plurality of call boxes each transmitting an individually unique digital code upon such times as services are requested, each call box including a time delay means for timing a first predetermined time period after transmitting of the digital code during which first time period the transmitting of digital code is inhibited; and a central station receiving the digital codes upon the times services are requested from the plurality of all boxes, and for digitally processing the codes to produce a display intelligible to a human to permit dispatching by said human of a requested service to a requesting call box location.

2. The telemetry system according to claim 1 wherein each of the plurality of call boxes comprises:

a radio transmitter transmitting by radio; and wherein the central station comprises:

a radio receiver receiving the radio-transmitted digital codes; and a computer digitally processing the codes to produce the display.

3. The telemetry system according to claim 2 wherein the radio receiver is transmitting, and the radio receiver is receiving, digital identification code by Frequency Shift Keying (FSK).

4. The telemetry system according to claim 2 wherein the digital identification code transmitted by the radio transmitter, and received by the radio receiver, is bi-phased modulated, Bi-Phase-M, digital code.

5. The telemetry system according to claim 4 wherein the bi-phased modulated digital identification code is redundantly transmitted for data security.

6. The telemetry system according to claim 1 wherein the digital codes transmitted by each of the call boxes and received by the central station comprise:

an encoded identification of the individual call box transmitting each unique digital code; and an encoded representation of a single message, one of the plurality of possible messages that are at different times and responsive to different stimuli, initiatable at each call box.

7. The digital system according to claim 6 wherein the plurality of possible messages comprise:

a request for transportation service; and an abnormal condition message.

8. The digital system according to claim 7 wherein the abnormal condition message is automatically generated in the call box in response to motional perturbations attendant upon vandalism.

9. The digital system according to claim 7 wherein the plurality of possible messages further comprise:

a low power message.

10. The digital system according to claim 7 wherein the plurality of messages further comprise:

a status report message;

wherein the status report message is periodically generated in and transmitted by the call box in order that the central station may, be receipt of the message, know that the call box still exists and is capable of transmitting.

11. The digital system according to claim 1 wherein the digital codes are redundantly transmitted by the call box in order that they may be more probably successfully received by the central station even when more than one digital code has been transmitted from more than one call box to the central station upon a single communication channel at the same time.

12. The digital system according to claim 11 wherein the single communications channel is broadcast radio.

13. The digital system according to claim 1 wherein each of the plurality of call boxes further comprises:

an indicator responsive to the expiration of the said first time period for displaying an indication that the service request is acknowledged;

14. The digital system according to claim 13 wherein the indicator is actuated for a predetermined second time period.

15. In a telemetry system having a plurality of transmitters each manually asynchronously initiatable at times for independently transmitting at times its unique identification, a receiver receiving the transmitted identifications of the plurality of transmitters and recognizing each such transmitted identification to be a request for a service, and a communications channel between the plurality of transmitters and the receiver upon which communications channel all the unique identifications must travel, wherein transmission of two or more identifications within a short period of time by two or more of the plurality of transmitters upon the single communications channel results in an improper recognition by the one receiver of the number of separate requests for a service that are outstanding to the one receivers because multiple asynchronous manual initializations of the transmitter within the short period of time really represent only one separate request for the service a method for reducing the erroneous recognition of multiple separate requests, the method comprising:

suspending the next transmission of each of a plurality of transmitters, upon those times that each does independently transmit its unique identification code, for an interval of time; and transmitting at each of the plurality of transmitters only one unique identification code in response to one or more manual asynchronous initiations received during the interval of time; and receiving at a receiver the one unique identification code transmitter at times from each of the plurality of transmitters during the interval of time; and recognizing each received identification code to be a separate request for a service.

16. In a telemetry system having call boxes unidirectionally communicating service requests to a central station, and a central station receiving the service requests from the call boxes, an improved call box directed to (i) reducing the number of redundant service requests resultant from multiple registration of a single request for service by a person at a call box, while (ii) providing positive feedback response to the person registering a request for service at the call box without involvement of the central station to the call box whereat the service request is registered, the improved call box comprising:

a time delay means, actuated by a person's registration of a request for service at the call box, for producing a signal for a delay time interval;

a service request inhibit means responsive to the delay time interval signal for inhibiting any further service request from the call box to the central station during the delay time interval regardless of the number of requests for services that are registered during the delay time interval; and an indicator responsive to the delay time interval signal for displaying to the person an indication that the request for service is acknowledged.

17. The telemetry system according to claim 16 wherein the central station is also improved for acting upon a service request that has been acknowledged by the improved call box to the person registering the same, the improved central station comprising:

a hierarchal store receiving the service request and all like service requests communicated from the call boxes.

* * * * *